United States Patent
Taliwal et al.

(10) Patent No.: US 10,692,050 B2
(45) Date of Patent: Jun. 23, 2020

(54) AUTOMATIC ASSESSMENT OF DAMAGE AND REPAIR COSTS IN VEHICLES

(71) Applicant: American International Group, Inc., New York, NY (US)

(72) Inventors: Vikas Taliwal, Boston, MA (US); Siddhartha Dalal, Bridgewater, NJ (US); Kaigang Li, Brooklyn, NY (US); Gaurav Sharma, Webster, NY (US)

(73) Assignee: American International Group, Inc., New York, NY (US)

( * ) Notice: Subject to any disclaimer, the term of this patent is extended or adjusted under 35 U.S.C. 154(b) by 899 days.

(21) Appl. No.: 15/092,480

(22) Filed: Apr. 6, 2016

(65) Prior Publication Data

US 2017/0293894 A1   Oct. 12, 2017

(51) Int. Cl.
| | |
|---|---|
| G06Q 40/08 | (2012.01) |
| G06Q 10/00 | (2012.01) |
| G06K 9/00 | (2006.01) |
| G06T 7/00 | (2017.01) |
| G06T 7/11 | (2017.01) |

(Continued)

(52) U.S. Cl.
CPC ......... *G06Q 10/20* (2013.01); *G06F 3/04842* (2013.01); *G06K 9/00671* (2013.01); *G06K 9/4609* (2013.01); *G06K 9/4671* (2013.01); *G06K 9/6201* (2013.01); *G06Q 30/0283* (2013.01); *G06Q 40/08* (2013.01); *G06T 7/0004* (2013.01); *G06T 7/11* (2017.01); *G06T 7/143* (2017.01); *G06T 7/33* (2017.01); *G06T 7/40* (2013.01); *G06T 19/003* (2013.01); *G06F 2203/04802* (2013.01); *G06K 2209/23* (2013.01); *G06T 7/194* (2017.01);
(Continued)

(58) Field of Classification Search
USPC ........................................................... 705/4
See application file for complete search history.

(56) References Cited

U.S. PATENT DOCUMENTS

| | | | |
|---|---|---|---|
| 10,304,137 B1 * | 5/2019 | Genser .................. | G06Q 40/08 |
| 10,380,696 B1 * | 8/2019 | Haller, Jr. .............. | G06Q 40/08 |

(Continued)

OTHER PUBLICATIONS

Dai, et al. "Convolutional Feature Masking for Joint Object and Stuff Segmentation," *IEEE Conference on Computer Vision and Pattern Recognition* (CVPR), pp. 3992-4000 (Jun. 7-12, 2015).

(Continued)

*Primary Examiner* — Hani M Kazimi
*Assistant Examiner* — Hatem M Ali
(74) *Attorney, Agent, or Firm* — Leydig, Voit & Mayer Ltd.

(57) ABSTRACT

A system and method are provided for automatically estimating a repair cost for a vehicle. A method includes: receiving, at a server computing device over an electronic network, one or more images of a damaged vehicle from a client computing device; performing image processing operations on each of the one or more images to detect external damage to a first set of parts of the vehicle; inferring internal damage to a second set of parts of the vehicle based on the detected external damage; and, calculating an estimated repair cost for the vehicle based on the detected external damage and inferred internal damage based on accessing a parts database that includes repair and labor costs for each part in the first and second sets of parts.

13 Claims, 19 Drawing Sheets

(51) Int. Cl.
  *G06T 7/143* (2017.01)
  *G06T 7/33* (2017.01)
  *G06K 9/46* (2006.01)
  *G06K 9/62* (2006.01)
  *G06F 3/0484* (2013.01)
  *G06Q 30/02* (2012.01)
  *G06T 7/40* (2017.01)
  *G06T 19/00* (2011.01)
  *G06T 7/194* (2017.01)

(52) U.S. Cl.
  CPC .............. *G06T 2207/30156* (2013.01); *G06T 2207/30252* (2013.01)

(56) References Cited

U.S. PATENT DOCUMENTS

| | | | | |
|---|---|---|---|---|
| 2003/0112263 | A1* | 6/2003 | Sakai | G06Q 40/02 715/716 |
| 2003/0233261 | A1* | 12/2003 | Kawahara | G06Q 10/10 705/4 |
| 2006/0114531 | A1* | 6/2006 | Webb | G01N 21/8806 359/15 |
| 2012/0076437 | A1* | 3/2012 | King | G06Q 10/10 382/286 |
| 2012/0297337 | A1* | 11/2012 | St. Denis | G08G 1/168 715/810 |
| 2014/0081675 | A1* | 3/2014 | Ives | G06Q 40/08 705/4 |
| 2014/0229207 | A1* | 8/2014 | Swamy | G06K 9/4604 705/4 |
| 2014/0316825 | A1* | 10/2014 | van Dijk | G06Q 40/08 705/4 |
| 2015/0106133 | A1 | 4/2015 | Smith, Jr. | |
| 2015/0170287 | A1* | 6/2015 | Tirone | G06Q 40/08 705/4 |
| 2015/0254818 | A1* | 9/2015 | Li | G06T 5/006 382/275 |
| 2017/0148102 | A1* | 5/2017 | Franke | G06Q 10/20 |
| 2017/0301154 | A1* | 10/2017 | Rozint | G06Q 10/20 |

OTHER PUBLICATIONS

Dollar, et al. "Fast Edge Detection Using Structured Forests," *IEEE Transactions on Pattern Analysis and Machine Intelligence*, vol. 37, Iss. 8, pp. 1558-1570 (Dec. 4, 2014).

Ren, et al. "Faster R-CNN: Towards Real-Time Object Detection with Region Proposal Networks," *IEEE Transactions on Pattern Analysis and Machine Intelligence*, vol. 39, Iss. 6, pp. 1137-1149 (Jun. 2017).

Pinheiro, et al. "Learning to Segment Object Candidates," *Proceedings of the 28th Int'l Conf. on Neural Information Processing Systems* (NIPS '15), pp. 1990-1998 (Dec. 7-12, 2015).

Selvaraju, et al. "Grad-CAM: Visual Explanations from Deep Networks via Gradient-based Localization," 2017 *IEEE International Conference on Computer Vision* (ICCV) (Oct. 22-29, 2017).

Felzenszwalb et al., "Object Detection with Discriminatively Trained Part Based Models," *Pattern Analysis and Machine Intelligence, IEEE Transactions on*, 32(9): 1627-1645 (2010).

Li et al., "Distance Regularized Level Set Evolution and Its Application to Image Segmentation," *IEEE Transactions on Image Processing*, 19(12): 3243-3254 (2010).

Murphy, "Undirected graphical models (Markov random fields)," *Machine learning: a probabilistic perspective*, MIT Press, 661-705 (2012).

Rother et al., "GrabCut"—Interactive Foreground Extraction using Iterated Graph Cuts, *ACM transactions on graphics* (*TOG*), 23(3), 309-314 (2004).

Zheng et al., "Conditional Random Fields as Recurrent Neural Networks," *Proceedings of the IEEE international Conference on Computer Vision*, 1529-1537 (2015).

Baumgärtel et al., "Detecting car damages with CAN networks" *CAN Newsletter*, 38-40 (Jan. 2014).

Chabot et al., Détection de pose de véhicule pour la reconnaissance de marquee et modèe—Pose detection for vehicle Make and Model Recognition, *Journées francophones des jeunes chercheurs en vision par ordinateur* (Jun. 2015).

Jayawardena, "Image Based Automatic Vehicle Damage Detection," (Nov. 2013).

Rhim et al., "A neural network approach for damage detection and identification of structures," *Computational Mechanics*, 16: 437-443 (1995).

Tulsiani et al., Viewpoints and Keypoints, *IEEE Conference on Computer Vision and Pattern Recognition* 1510-1519 (2015).

European Patent Office, International Search Report and the Written Opinion in International Application No. PCT/US2016/042783 (dated Nov. 9, 2016).

Dai, et al. "Instance-Aware Semantic Segmentation via Multi-task Network Cascades," *2016 IEEE Conference on Computer Vision and Pattern Recognition* (*CVPR*), pp. 3150-3158 (Jun. 2016).

European Patent Office, International Preliminary Report on Patentability in International Application No. PCT/US2016/042783 (dated Oct. 9, 2018).

\* cited by examiner

AUTOMATIC ASSESSMENT OF DAMAGE AND REPAIR COSTS IN VEHICLES

BACKGROUND

Currently, after a vehicle has been damaged in a road accident or otherwise, the vehicle must be taken by the owner or a tow company to an auto repair shop for inspection. Inspection of the vehicle by a mechanic at the auto repair shop is required in order to assess which parts of the vehicle need to be repaired or replaced. An estimate is then generated based on the inspection. In some cases, when an insurance claim is filed, the estimate is forwarded to an insurance company to approve the repairs before the repairs are made to the vehicle.

From end-to-end, the process of vehicle inspection, estimate generation, claim approval, and vehicle repair can be long and complex, involving several parties including at least a customer, an auto repair shop, and a claim adjustor.

Accordingly, there is a need in the art for an improved system that overcomes some of the drawbacks and limitations of conventional approaches.

SUMMARY

One embodiment of the disclosure includes a method for automatically estimating a repair cost for a vehicle, comprising: receiving, at a server computing device over an electronic network, one or more images of a damaged vehicle from a client computing device; performing computerized image processing on each of the one or more images to detect damage to a set of parts of the vehicle; and, calculating an estimated repair cost for the vehicle based on the detected damage based on accessing a parts database that includes repair costs. Additionally, in some embodiments, the server computing device may classify the loss as a total, medium, or small loss.

Another embodiment of the disclosure provides a method for automatically estimating a repair cost for a vehicle, comprising: receiving, at a server computing device over an electronic network, one or more images of a damaged vehicle from a client computing device; performing image processing operations on each of the one or more images to detect external damage to a first set of parts of the vehicle; inferring internal damage to a second set of parts of the vehicle based on the detected external damage; and, calculating an estimated repair cost for the vehicle based on the detected external damage and inferred internal damage based on accessing a parts database that includes repair and labor costs for each part in the first and second sets of parts. Additionally, in some embodiments, the server computing device may classify the loss as a total, medium, or small loss.

Another embodiment of the disclosure provides a mobile device comprising a camera, a display device, a processor, and a memory. The memory stores instructions that, when executed by the processor, cause the mobile device to display prompts on the display device to capture damage to a vehicle with the camera, by performing the steps of: receiving, in a first user interface screen displayed on the display device, a selection to initiate a new vehicle claim; displaying, in a second user interface screen displayed on the display device, graphical elements for selection of a prompting interface for capture of images of damage to the vehicle; receiving selection of a graphical element corresponding to a prompting interface; displaying one or more prompts on the display device to capture a portion of the vehicle based on the selection of the graphical element corresponding to the prompting interface; causing the camera of the client device to capture an image of the vehicle based on displaying an outline of the portion of the vehicle; and, causing the image of the vehicle to be uploaded to a server for estimation of repair costs of the vehicle based on the image. Additionally, in some embodiments, the server computing device may classify the loss as a total, medium, or small loss.

Another embodiment of the disclosure provides a system for estimating a repair cost for a vehicle. The system includes a client computing device, an electronic communications network, and a server computing device. The client computing device is configured to: display one or more prompts on a display device of the client computing device to capture a portion of the vehicle that has sustained damage, and capture an image of the vehicle based on displaying an outline of the portion of the vehicle. The electronic communications network is configured to transfer the image of the vehicle to a server computing device. The server computing device is configured to: receive the image over the electronic communications network, perform image processing operations on the image to identify one or more damaged parts of the vehicle, and calculate an estimated repair cost for the vehicle based on accessing a parts database that includes repair and labor costs for each part in the one or more damaged parts. Additionally, in some embodiments, the server computing device may classify the loss as a total, medium, or small loss.

DETAILED DESCRIPTION

Figure 1:
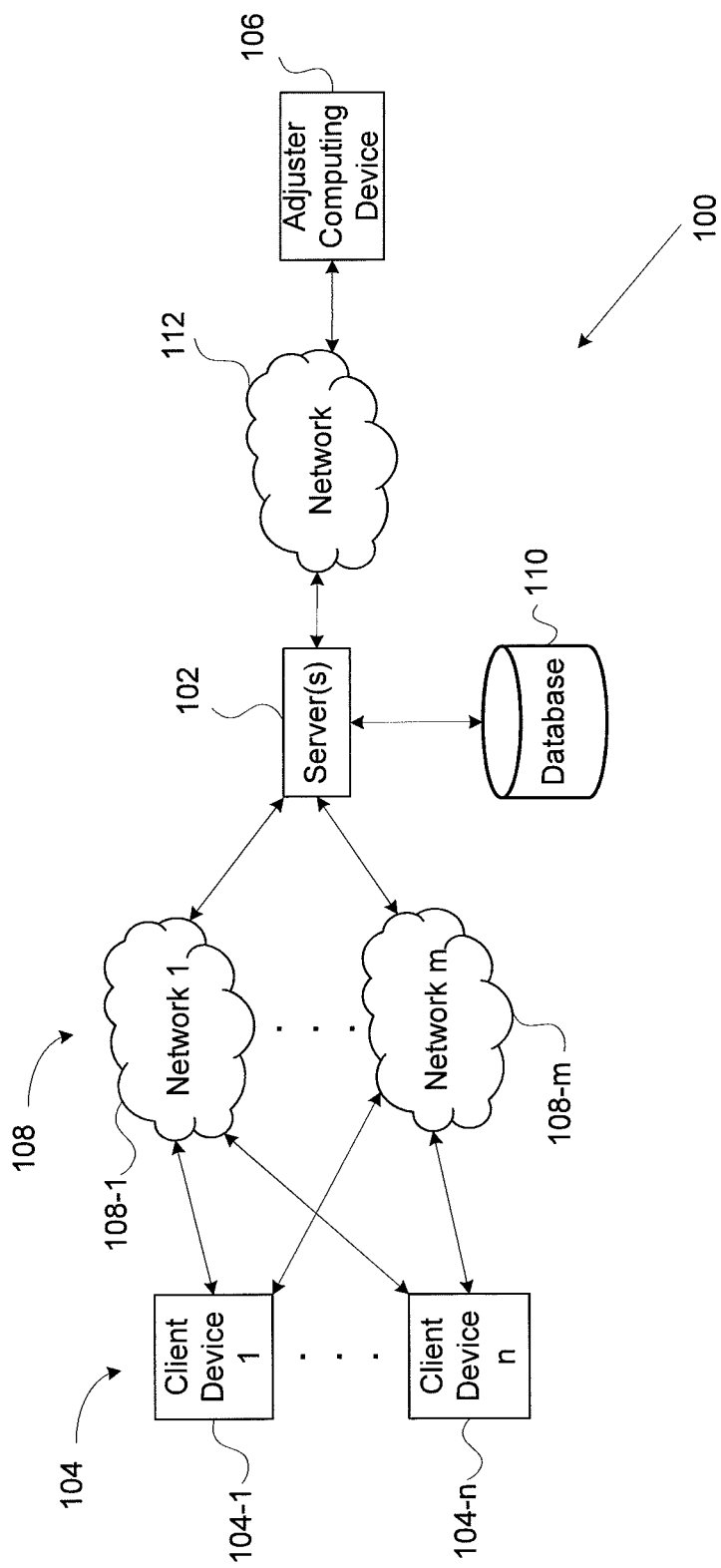
FIG. 1 is a block diagram illustrating a system in accordance with some example embodiments of the disclosure.

Embodiments of the disclosure provide systems and methods that apply computer vision and image processing to images of a damaged vehicle to determine which parts of the vehicle are damaged and estimate the cost of repair or replacement, thus automating the damage assessment and cost appraisal process. Additionally, in some embodiments, the server computing device may classify the loss as a total, medium, or small loss.

The disclosed automatic vehicle damage assessment system is a software system that uses captured images of a damaged vehicle along with auxiliary information available from other sources to assess the damage and, optionally, to provide an appraisal of damage and estimate of repair costs. In some embodiments, the captured images comprise one or more still images of the damaged vehicle and damaged areas. The auxiliary data includes the vehicle's make, model, and year. In other embodiments, the captured images include not only still images, but also video, LIDAR imagery, and/or imagery from other modalities. In some embodiments, the auxiliary information includes additional information available from insurance and vehicle registration records, publicly available information for the vehicle make and model, vehicle data from on-board sensors and installed devices, as well as information regarding the state of the imaging device at the time of image capture, including location information (e.g., GPS coordinates), orientation information (e.g., from gyroscopic sensors), and settings, among others.

The automatic vehicle damage assessment system is a first-of-its-kind system that leverages state-of-the-art computer vision and machine learning technologies to partially or fully automate the auto claims submission and settlement process, thereby introducing efficiencies in auto insurance claims processing. The system can be expanded to additional sensors and information sources as these become available on smartphone devices including, for instance, stereo/depth sensing modalities. Additionally, in some embodiments, the image capture process can be interactive, with an application ("app") installed on a smartphone or other client device that guides a user through the process of capturing images of the damaged vehicle.

In one example implementation, images (e.g., photos or videos) showing damage to the vehicle are captured soon after the damage occurs. The images can be taken with a mobile phone and sent to a server by the vehicle owner or driver over a cellular or wireless network connection, either through a proprietary platform such a mobile application or through a web-based service. In some embodiments, an insurance company field inspector or adjustor visits the vehicle site, captures the requisite images and uploads them to the server, as is currently done in some jurisdictions or countries. In further embodiments, the images can be captured by an auto repair shop to which the vehicle is taken after an accident.

In embodiments where a mobile phone is used to collect the images, information about the camera's location from the mobile phone GPS system, the camera's orientation from the mobile phone's gyroscope and accelerometer, the time at which the images are taken, and the camera's resolution, image format, and related attributes can also be provided to the server.

In embodiments where a telematics system is installed in the vehicle, the telematics system can provide information to the server about the vehicle's state at, prior to, and/or after the time of accident, velocity and acceleration profile of the vehicle, states of the airbags and turn signals, and other relevant vehicle state data.

Certain "metadata" about the vehicle are also available and stored in a database accessible by the server. The metadata includes at least the vehicle make, model, and year. The metadata may optionally include images of the vehicle prior to the occurrence of damage.

According to embodiments of the disclosure, the assessment of damage and associated repair costs relies upon image processing and machine learning technologies. Computer vision techniques are used to first clean the received images of unwanted artifacts, such as background clutter and specular reflections, and then, to find the best matching image of a reference vehicle of the same make/model/year. The system compares the received images with the corresponding reference images along several attributes, e.g., edge distribution, texture, and shape. Using a variety of computer vision techniques, the system recognizes where and how the received images depart from the reference images, and identifies the corresponding part(s) and/or regions on the exterior of the vehicle that are damaged. The reference images can, in some embodiments, be derived from a commercial 3D model of a vehicle of the same make and model, or from images of the same vehicle taken prior to the occurrence of damage in the current claim, e.g., at the time of purchase of the auto policy.

Alternatively and in parallel, a deep learning system (e.g., Convolutional Neural Network) is trained on a large number of images of damaged vehicles and corresponding information about damage, e.g., its extent and location on the vehicle, which are available from an insurance company's auto claims archives, in order to learn to assess damage presented with input images for a new auto claim. Such a pattern learning method can predict damage to both the exterior and interior of the vehicle, as well as the associated repair costs. The assessment of damage to the exterior determined by the image processing system can be used as input to the pattern learning system in order to supplement and refine the damage assessment. The current level of damage can be compared with the level of damage prior to filing of the current claim, as determined using image processing of prior images of the vehicle with the same system.

A comprehensive damaged parts list is then generated to prepare an estimate of the cost required to repair the vehicle by looking up in a parts database for parts and labor cost. In the absence of such a parts database, the system can be trained to predict the parts and labor cost associated with a damage assessment, since these are also available in the archival data. In some embodiments, the regions and/or areas of damage on the exterior of the vehicle can also be identified.

In some embodiments, when additional information about the state of the vehicle at the time of the accident as well as of the camera used to take its images is available, the additional information can be used to further refine the system's predictive capabilities. In particular, knowing the location, velocity, and acceleration of the vehicle at the time of accident allows an assessment of the extent of impact to the vehicle during the accident, which allows better estimation of the extent of damage to the exterior and interior of the vehicle. Knowing further whether airbags were deployed during the collision can be useful for determination of the extent of damage, including whether there might be a "total loss" of the vehicle. The orientation of the camera when used to take images of the vehicle, as well as its location and time, can also assist the damage detection system in carrying out various image processing operations, as will become apparent during the discussion below.

Advantageously, the automatic vehicle damage assessment systems and methods provided herein allow an insurance company to increase its efficiency of auto claims settlement processes. For example, automatic determination of "small value" claims can be settled rapidly without requiring time and effort on the part of adjustors to adjudicate. Automatic determination of "total loss" claims can also lead to early settlement of the claim, resulting in substantial savings in vehicle storage costs. Automatic verification of the damage appraisals sent by auto repair shops can supplant manual inspection of appraisals by adjustors and, in many cases, lead to efficiencies in adjustor involvement. Data aggregated across multiple claims and repair shops can also help identify misleading appraisals and recurrent fraudulent activity by repair shops. Early notification of the nature of damage can be sent to partner repair shops, allowing them to schedule the resources needed for repair early and more efficiently, reducing customer wait times, and thereby, rental vehicle costs.

Also, customer satisfaction is enhanced in multiple ways. First, the system can rapidly identify the claims that have a small amount of damage and the claims that have such severe damage that the vehicle can not be repaired and is a "total loss." In at least these two cases, the customer can be sent a settlement check almost immediately upon filing of the claim, with minimal involvement of human adjustors. In other cases, where the damage falls between the two extremes and the vehicle has to be taken to an auto repair shop, appraisal of the damage by the shop can be automatically checked by the system, leading to detection of potentially fraudulent claims, again with minimal requirement of a human adjustors' time and effort.

Turning now to the figures, FIG. 1 is a block diagram of a system 100 in accordance with certain embodiments of the disclosure. The system 100 includes a server or cluster of servers 102, one or more client devices labeled 104-1 through 104-n, an adjuster computing device 106, several network connections linking client devices 104-1 through 104-n to server(s) 102 including the network connections labeled 108-1 through 108-m, one or more databases 110, and a network connection 112 between the server(s) 102 and the adjuster computing device 106.

The client device or plurality of client devices 104 and the adjuster computing device 106 can be any type of communication devices that support network communication, including a telephone, a mobile phone, a smart phone, a personal computer, a laptop computer, a smart watch, a personal digital assistant (PDA), a wearable or embedded digital device(s), a network-connected vehicle, etc. In some embodiments, the client devices 104 and adjuster computing device 106 can support multiple types of networks. For example, the client devices 104 and the adjuster computing device 106 may have wired or wireless network connectivity using IP (Internet Protocol) or may have mobile network connectivity allowing over cellular and data networks.

The various networks 108, 112 may take the form of multiple network topologies. For example, network 108 comprises wireless and/or wired networks. Networks 108 link the server 102 and the client devices 104. Networks 108 include infrastructure that support the links necessary for data communication between at least one client device 104 and server 102. Networks 108 may include a cell tower, base station, and switching network.

As described in greater detail herein, client devices 104 are used to capture one or more images of a damaged vehicle. The images are transmitted over a network connection 108 to a server 102. The server 102 processes the images to estimate damage and repair costs. The estimates are transmitted over network connection 112 to the adjust computer device 106 for approval or adjustment.

Figure 2:
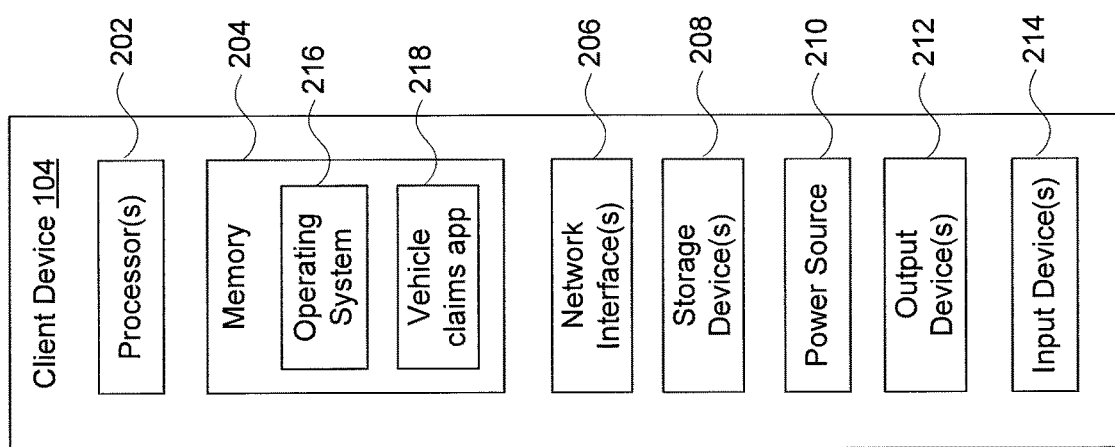
FIG. 2 is a block diagram illustrating components of a client device from the system illustrated in FIG. 1 according to some embodiments of the disclosure.

FIG. 2 is a block diagram of basic functional components for a client device 104 according to some aspects of the disclosure. In the illustrated embodiment of FIG. 2, the client device 104 includes one or more processors 202, memory 204, network interfaces 206, storage devices 208, power source 210, one or more output devices 212, one or more input devices 214, and software modules—operating system 216 and a vehicle claims application 218—stored in memory 204. The software modules are provided as being contained in memory 204, but in certain embodiments, the software modules are contained in storage devices 208 or a combination of memory 204 and storage devices 208. Each of the components including the processor 202, memory 204, network interfaces 206, storage devices 208, power source 210, output devices 212, input devices 214, operating system 216, the network monitor 218, and the data collector 220 is interconnected physically, communicatively, and/or operatively for inter-component communications.

As illustrated, processor 202 is configured to implement functionality and/or process instructions for execution within client device 104. For example, processor 202 executes instructions stored in memory 204 or instructions stored on a storage device 208. Memory 204, which may be a non-transient, computer-readable storage medium, is configured to store information within client device 104 during operation. In some embodiments, memory 204 includes a temporary memory, an area for information not to be maintained when the client device 104 is turned off. Examples of such temporary memory include volatile memories such as random access memories (RAM), dynamic random access memories (DRAM), and static random access memories (SRAM). Memory 204 also maintains program instructions for execution by the processor 202.

Storage device 208 also includes one or more non-transient computer-readable storage media. The storage device 208 is generally configured to store larger amounts of information than memory 204. The storage device 208 may further be configured for long-term storage of information. In some embodiments, the storage device 208 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

Client device 104 uses network interface 206 to communicate with external devices or server(s) 102 via one or more networks 108 (see FIG. 1), and other types of networks through which a communication with the client device 104 may be established. Network interface 206 may be a network interface card, such as an Ethernet card, an optical transceiver, a radio frequency transceiver, or any other type of device that can send and receive information. Other non-limiting examples of network interfaces include Bluetooth®, 3G and Wi-Fi radios in client computing devices, and Universal Serial Bus (USB).

Client device 104 includes one or more power sources 210 to provide power to the device. Non-limiting examples of power source 210 include single-use power sources, rechargeable power sources, and/or power sources developed from nickel-cadmium, lithium-ion, or other suitable material.

One or more output devices 212 are also included in client device 104. Output devices 212 are configured to provide output to a user using tactile, audio, and/or video stimuli. Output device 212 may include a display screen (part of the presence-sensitive screen), a sound card, a video graphics adapter card, or any other type of device for converting a signal into an appropriate form understandable to humans or machines. Additional examples of output device 212 include a speaker such as headphones, a cathode ray tube (CRT) monitor, a liquid crystal display (LCD), or any other type of device that can generate intelligible output to a user.

The client device 104 includes one or more input devices 214. Input devices 214 are configured to receive input from a user or a surrounding environment of the user through tactile, audio, and/or video feedback. Non-limiting examples of input device 214 include a photo and video camera, presence-sensitive screen, a mouse, a keyboard, a voice responsive system, microphone or any other type of input device. In some examples, a presence-sensitive screen includes a touch-sensitive screen.

The client device 104 includes an operating system 216. The operating system 216 controls operations of the components of the client device 104. For example, the operating system 216 facilitates the interaction of the processor(s) 202, memory 204, network interface 206, storage device(s) 208, input device 214, output device 212, and power source 210.

As described in greater detail herein, the client device 104 uses vehicle claims application 218 to capture one or more images of a damaged vehicle. In some embodiments, the vehicle claims application 218 may guide a user of the client device 104 as to which views should be captured. In some embodiments, the vehicle claims application 218 may interface with and receive inputs from a GPS transceiver and/or accelerometer.

Server(s) 102 is at least one computing machine that can automatically calculate an estimate for vehicle repair costs based on images provided from a client device 104. The server 102 has access to one or more databases 110 and other facilities that enable the features described herein.

According to certain embodiments, similar elements shown in FIG. 2 to be included in the client device 104 can also be included in the adjuster computing device 106. The adjuster computing device 106 may further include software stored in a memory and executed by a processor to review and adjust repair cost estimates generated by the server 102.

Figure 3:
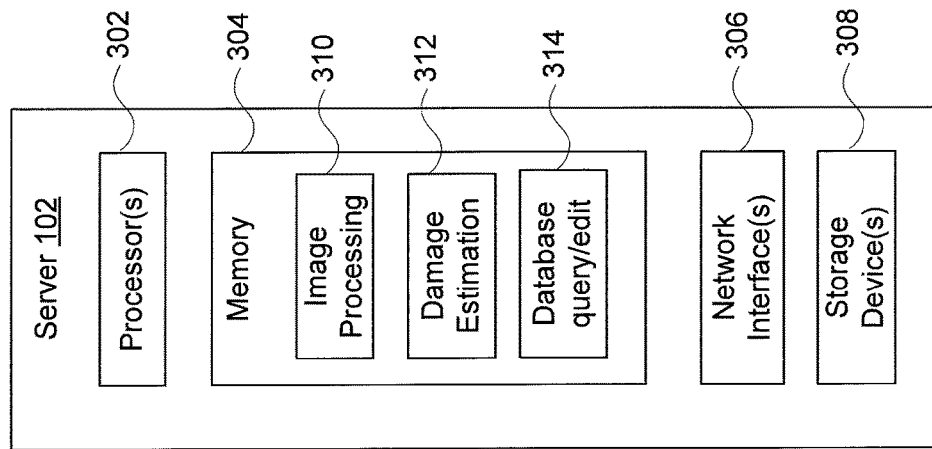
FIG. 3 is a block diagram illustrating components for a server from the system illustrated in FIG. 1 according to some embodiments of the disclosure.

Turning to FIG. 3, a block diagram is shown illustrating components for a server 102, according to certain aspects of the disclosure. Server 102 includes one or more processors 302, memory 304, network interface(s) 306, storage device(s) 308, and software modules—image processing engine 310, damage estimation engine 312, and database query and edit engine 314—stored in memory 304. The software modules are provided as being stored in memory 304, but in certain embodiments, the software modules are stored in storage devices 308 or a combination of memory 304 and storage devices 308. In certain embodiments, each of the components including the processor(s) 302, memory 304, network interface(s) 306, storage device(s) 308, media manager 310, connection service router 312, data organizer 314, and database editor 316 are interconnected physically, communicatively, and/or operatively for inter-component communications.

Processor(s) 302, analogous to processor(s) 202 in client device 104, is configured to implement functionality and/or process instructions for execution within the server 102. For example, processor(s) 302 executes instructions stored in memory 304 or instructions stored on storage devices 308. Memory 304, which may be a non-transient, computer-readable storage medium, is configured to store information within server 102 during operation. In some embodiments, memory 304 includes a temporary memory, i.e., an area for information not to be maintained when the server 102 is turned off. Examples of such temporary memory include volatile memories such as random access memories (RAM), dynamic random access memories (DRAM), and static random access memories (SRAM). Memory 304 also maintains program instructions for execution by processor(s) 302.

Server 102 uses network interface(s) 306 to communicate with external devices via one or more networks depicted as network 108 and network 112 in FIG. 1. Such networks may also include one or more wireless networks, wired networks, fiber optics networks, and other types of networks through which communication between the server 102 and an external device may be established. Network interface(s) 306 may be a network interface card, such as an Ethernet card, an optical transceiver, a radio frequency transceiver, or any other type of device that can send and receive information.

Storage devices 308 in server 102 also include one or more non-transient computer-readable storage media. Storage devices 308 are generally configured to store larger amounts of information than memory 304. Storage devices 308 may further be configured for long-term storage of information. In some examples, storage devices 304 include non-volatile storage elements. Non-limiting examples of non-volatile storage elements include magnetic hard discs, optical discs, floppy discs, flash memories, resistive memories, or forms of electrically programmable memories (EPROM) or electrically erasable and programmable (EEPROM) memories.

Server 102 further includes instructions that implement an image processing engine 310 that receives images of a damaged vehicle from one or more client devices 104 and performs image processing on the images. Server 102 further includes instructions that implement a damage estimation engine 312 that receives the images processed by the image processing engine 310 and, in conjunction with a database query and edit engine 314 that has access to a database 110 storing parts and labor costs, calculates an estimate for repair or replacement of the damaged vehicle.

Figure 4:
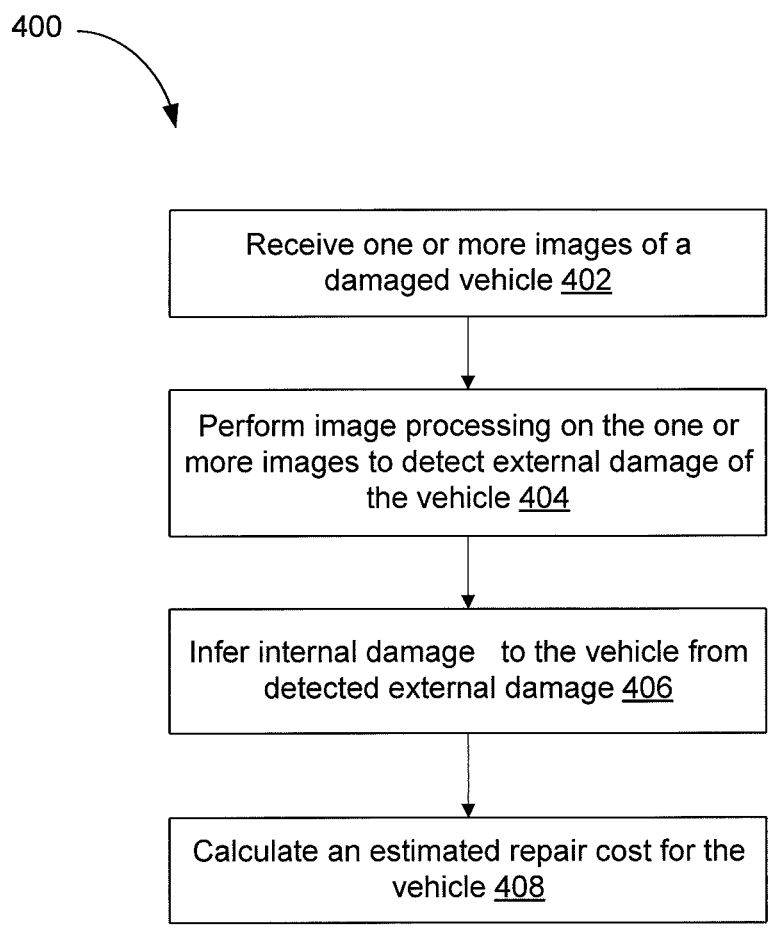
FIG. 4 is a flow diagram of method steps for automatically estimating a repair cost for a vehicle, according to one embodiment of the disclosure.

FIG. 4 is a flow diagram of method steps for automatically estimating a repair cost for a vehicle, according to one embodiment of the disclosure. As shown, the method 400 begins at step 402, where a server, such as server 102, receives one or more images of a damaged vehicle from a client device. In some embodiments, the images may include additional metadata, such as GPS location.

At step 404, the server performs image processing on the one or more images to detect external damage of the vehicle. As described in greater detail in FIG. 5, performing image processing on the one or more images includes: image cleaning to remove artifacts such as background and specular reflection, image alignment to an undamaged version of the vehicle, image segmentation into vehicle parts, and damage assessment, including edge distribution, texture comparison, and spatial correlation detection.

In some embodiments, if the camera's position and orientation are known for a given image, this information can help with the image alignment step by providing a rough estimation of the two-dimensional projection required to produce the reference image. In some embodiments, if an outline of the vehicle or the part whose image is intended to be taken is placed within the camera view for the image taker to align the image to, then the accuracy and efficiency of the background removal procedure can be substantially improved. In some embodiments, if the state of the vehicle just prior to and during the accident can be obtained from a telematics system, then a dynamic model of the vehicle movement can be constructed, the forces each part of the vehicle is subject during any impact estimated, and therefore, the amount of its distortion including displacement in depth assessed.

At step 406, the server infers internal damage to the vehicle from detected external damage. Once the externally damaged parts are identified, the server can look up in a database which internal parts are also likely to be replaced based on the set of damaged external parts. This inference can be based on historical models for which internal parts needed to be replaced given certain external damage in prior repairs.

At step 408, the server calculates an estimates repair cost for the vehicle based on the detected external damage and inferred internal damage. The server accesses one or more databases of parts and labor cost for each external and internal part that is estimated to need repair or replacement. The estimate can be provided to an insurance claim adjuster for review, adjustment, and approval.

Figure 5:
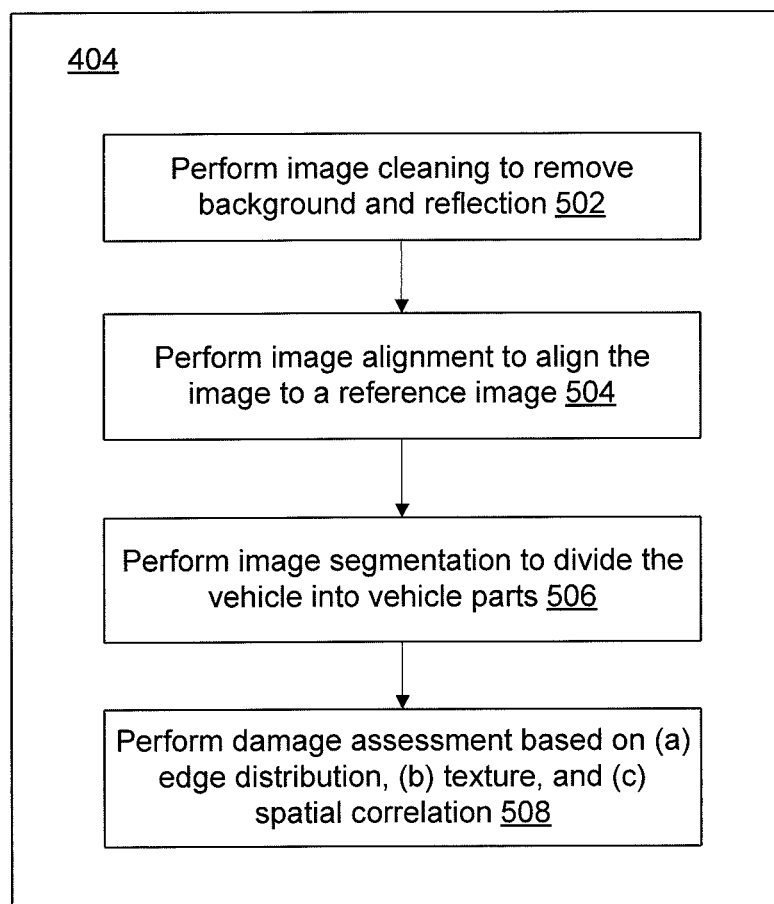
FIG. 5 is a flow diagram of method steps for performing image processing on one or more images to detect external damage of the vehicle, according to one embodiment of the disclosure.

FIG. 5 is a flow diagram of method steps for performing image processing on one or more images to detect external damage of the vehicle, according to one embodiment of the disclosure. In some embodiments, the steps of the method shown in FIG. 5 provided an implementation of step 404 from FIG. 4.

As shown in FIG. 5, the method begins at step 502, where a server performs image cleaning to remove background and specular reflection. As step 504, the server performs image alignment to align the image to a reference image. As step 506, the server performs image segmentation to divide the vehicle into vehicle parts. As step 508, the server performs damage assessment based on (a) edge distribution, (b) texture, and (c) spatial correlation.

Each of the one or more images provided to the server from the client device is processed separately according to the method shown in FIG. 5. A detailed explanation of performing each of steps 502, 504, 506, 508 is provided below.

At step 502 (i.e., image cleaning), each image is cleaned to remove background and specular reflections due to incident light.

In a first embodiment of implementing step 502, background removal can be performed with image segmentation using Conditional Random Fields (CRF) realized as Recurrent Neural Networks (RNN).

In the technique, the image is modeled as a conditional random field. Each pixel in the image is regarded as a node in a mathematical graph. Two nodes are connected by an edge in the graph if their corresponding pixels are neighbors. Each node is assigned a binary label according to whether the corresponding pixel is deemed to belong to the foreground (i.e., the vehicle) or the background. The binary label can be taken to be 1 for the foreground and −1 for the background. Once all of the pixels in the image have been assigned a binary label properly, the pixels labeled as background can be removed achieving segmentation of the background.

In order to find the node binary labels, two functions are used. The value of the function $\psi_u(x_i)$ denotes the "cost" of the node I taking the value $x_i$. The value of the function $\psi_u(x_i, x_j)$ denotes the "cost" of the neighboring nodes I and J taking the value $x_i$ and $x_j$, respectively. Using these functions, the following energy function for an image X can be defined:

$$E(x) = \sum_i \psi_u(x_i) + \sum_{i<j} \psi_p(x_i, x_j),$$

The probability of an image is defined to be $e^{(-E(X))}$ suitably normalized. The task is to learn the parameters of two functions $\psi_u$ and $\psi_p$ from a large database of real images so that their probabilities are maximized, or equivalently, their energies are minimized.

The unary function $\psi_u$ can be learned using a convolutional neural network (CNN). The network is repeatedly shown a succession of training images in which each pixel has been correctly labeled as foreground/background. Starting with random weights, the weights are adjusted using a standard backpropagation algorithm in order to predict the labeling correctly.

The function $\psi_p$ can be modeled as:

$$\psi_p(x_i, x_j) = \mu(x_i, x_j) \sum_{m=1}^{M} w^{(m)} k_G^{(m)}(f_i, f_j),$$

where $k_G$ is a Gaussian kernel, $f_i$ are features derived from the image and $\mu$ is a label-compatibility function. $\psi_p$ can be learned using the following algorithm, in the which the steps can be implemented as a CNN:

$Q_i(l) \leftarrow \frac{1}{Z_i} \exp(U_i(l))$ for all $i$ ▷ Initialization while not converged do $\hat{Q}_i^{(m)}(l) \leftarrow \Sigma_{j \neq i} k^{(m)}(f_i, f_j) Q_j(l)$ for all $m$ ▷ Message Passing $\tilde{Q}_i(l) \leftarrow \Sigma_m w^{(m)} \hat{Q}_i^{(m)}(l)$ ▷ Weighting Filter Outputs -continued $\tilde{Q}_i(l) \leftarrow \Sigma_{l' \in \mathcal{L}} \mu(l, l') \hat{Q}_i(l')$ ▷ Compatability Transform $\tilde{Q}_i(l) \leftarrow U_i(l) - \tilde{Q}_i(l)$ ▷ Adding Unary Potentials $Q_i \leftarrow \frac{1}{Z_i} \exp(\tilde{Q}_i(l))$ ▷ Normalizing end while In a second embodiment of implementing step 502, for background removal, an "active contour" technique can be used to produce a curve called a contour that lies as close to the boundary of the vehicle in the image as possible. The contour serves to separate the vehicle from its background. Anything outside the curve is then removed (e.g., by converting that part of image to black or white, depending on the color of the vehicle).

In one embodiment, the active contour technique starts with a user-supplied initial contour (i.e., closed curve) containing the vehicle within the photo and defining an energy function of the contour that takes its minimum value when the contrast in color and intensity across the contour is maximum, which is assumed to be the indicator of the vehicle boundary. For example, the user-supplied initial contour can be provided by an insurance adjuster utilizing a computing device in communication with the server.

The initial contour is evolved along the gradient of the energy function until the gradient becomes zero, i.e., when the energy function has achieved an extremal value. An energy function E is defined so that its minimum should correspond to a good segmentation of the image into foreground and background:

$$E(\underline{\alpha}, k, \underline{\theta}, z) = U(\underline{\alpha}, k, \underline{\theta}, z) + V(\underline{\alpha}, z),$$

where the U( ) evaluates the color distribution and V( ) evaluates the edge or gradient distribution, $z=(z_1, \ldots, z_n, \ldots, z_N)$ is the image thought of as an RGB-valued array, and $\alpha \in \{0,1\}$ is the binary segmentation map, with 0 for background and 1 for foreground. For each assignment of values of α to the pixels the corresponding energy can be computed.

In one embodiment, the color term U is a Gaussian Mixture Model (GMM) defined as follows:

$$U(\underline{\alpha}, k, \underline{\theta}, z) = \sum_n D(\alpha_n, k_n, \underline{\theta}, z_n),$$

$$D(\alpha_n, k_n, \underline{\theta}, z_n) = -\log p(z_n \mid \alpha_n, k_n, \underline{\theta}) - \log \pi(\alpha_n, k_n)$$

where p( ) is a Gaussian probability distribution and π( ) is the mixture weighting coefficient, so that:

$$D(\alpha_n, k_n, \underline{\theta}', z_n) = -\log \pi(\alpha_n, k_n) + \frac{1}{2} \log \det \Sigma(\alpha_n, k_n) + \frac{1}{2} [z_n - \mu(\alpha_n, k_n)]^T \Sigma(\alpha_n, k_n)^{-1} [z_n - \mu(\alpha_n, k_n)].$$

Therefore, the color modeling parameters are:

$$\underline{\theta} = \{\pi(\alpha, k), \mu(\alpha, k), \Sigma(\alpha, k), \alpha = 0, 1, k = 1 \ldots K\}$$

In one embodiment, the edge term V is defined as:

$$V(\underline{\alpha}, z) = \gamma \sum_{(m,n) \in C} [\alpha_n \neq \alpha_m] \exp - \beta \|z_m - z_n\|^2$$

where [ ] denotes the indicator function taking values 0 or 1, C is the set of pairs of neighboring pixels, and other two scalars are input parameters (determined by experiments).

In one embodiment, a user, such as a claims adjuster, initializes the process by supplying an initial background for the image. For example, initialize a=0 for pixels in background and a=1 for pixels in foreground. An iterative process is then performed as follows:

Iterative minimisation

1. Assign GMM components to pixels:

$k_n := \arg\min_{k_n} D_n(\alpha_n, k_n, \theta, z_n).$

2. Learn GMM parameters from data z:

$\underline{\theta} := \arg\min_{\underline{\theta}} U(\underline{\alpha}, k, \underline{\theta}, z)$ 3. Estimate segmentation use min cut to solve:

$\min_{\{\alpha_n: n \in T_U\}} \min_k E(\underline{\alpha}, k, \underline{\theta}, z).$ 4. Repeat from step 1, until convergence.

However, the choice of the initial contour is critical, and the active contour technique itself does not specify how to choose an appropriate initial contour. Since the location of the vehicle within the image is not known, one might put the initial contour at or close to the boundary of the photo in order to ensure that the vehicle is always contained within it. However, this often results in other objects being included in the final result of the background removal process.

Some embodiments of the disclosure improve upon existing techniques by using a Deformable Part Model (DPM) to obtain the initial contour. DPM is a machine learning model usually used to recognize objects made of moveable parts. At a high level, DPM can be characterized by strong low-level features based on histograms of oriented gradient (HOG) that is globally invariant to illumination and locally invariant to translation and rotation, efficient matching algorithms for deformable part-based models, and discriminative learning with latent variables. After training on a large database of vehicles in various orientations, the DPM learns to put a bounding box around the vehicle in the photo. This bounding box can then serve as the initial contour.

Even with a much better choice of initial contour, the background removal process is not always perfect due to the presence of damage and specular reflections. For example, sometimes only part of the vehicle is retained. To solve this problem, embodiments of the disclosure provide a solution by first segmenting the image into "super-pixels." A super-pixel algorithm group pixels into perceptually meaningful atomic regions. Therefore, if parts of the atomic region are missing, embodiments of the disclosure can recover them by checking atomic region integrity. In one implementation, k-means clustering can be used to generate super-pixels. The similarity measurement for pixels is determined by the Euclidean distance in LAB space (i.e., a type of color space).

In view of the above, embodiments of the disclosure provide novel image processing techniques to achieve excellent performance on background removal.

Figure 8:
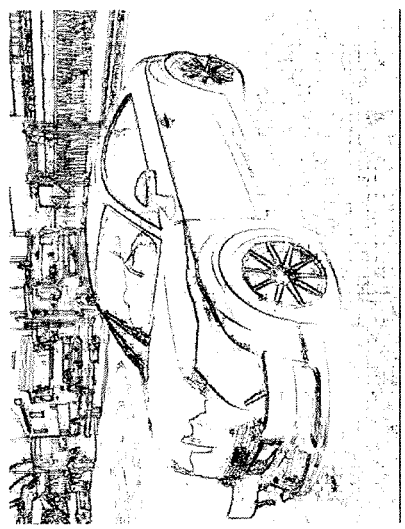
FIG. 8 is an example of an edge distribution of the input image from FIG. 6, according to one embodiment of the disclosure.
Figure 7:
FIG. 7 is an example of a color distribution of the input image from FIG. 6, according to one embodiment of the disclosure.
Figure 6:
FIG. 6 is an example of an input image of a damaged vehicle, according to one embodiment of the disclosure.

FIG. 6 is an example of an input image of a damaged vehicle, according to one embodiment of the disclosure. FIG. 7 is an example of a color distribution of the input image from FIG. 6, according to one embodiment of the disclosure. FIG. 8 is an example of an edge distribution of the input image from FIG. 6, according to one embodiment of the disclosure.

In some embodiments, specular reflection removal is also used to remove specular reflections on the metallic surfaces of the vehicle. Reflection removal is performed by a combination of two techniques. In a first technique, embodiments of the disclosure apply a high-pass spatial filter to the image. Applying a high-pass filter assumes that specular reflections are low spatial frequency additive components of the image intensity. The frequency threshold of the filter can be determined empirically.

In a second technique, embodiments of the disclosure apply a method that examines each pixel of the image. Pixels whose intensity values have reached a maximum in either of the three color channels (i.e., red (R), green (G), and blue (B)) are assumed to be "saturated" due to strong incident light, and are re-assigned color values of nearby pixels that are of the same color, but unsaturated. This technique of finding the appropriate nearest unsaturated pixel is novel relative to conventional approaches. Among the nearest such pixels, embodiments of the disclosure choose the ones that lie on the same part of the vehicle as the saturated pixel in question, which ensures that they have the same true color, and use the mean ratios between the R, G and B values of the unsaturated pixels to correct the RGB values of the saturated pixel because despite considerable lighting variations, the ratios are supposed to remain invariant.

Figure 9C:
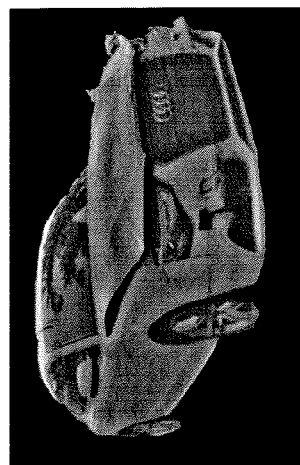
FIGS. 9A-9C illustrate a specular reflection removal process, according to one embodiment of the disclosure.
Figure 9B:
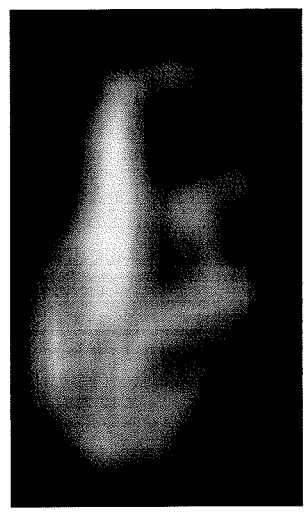
Figure 9A:
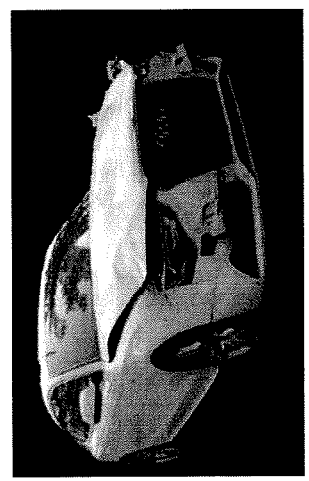

FIGS. 9A-9C illustrate a specular reflection removal process, according to one embodiment of the disclosure. FIG. 9A illustrates an input image of a damaged vehicle with the background removed. FIG. 9B illustrates the low frequency components of a damaged vehicle in FIG. 9A. FIG. 9C illustrates a reflection-removed version of the vehicle in FIG. 9A, with low frequency components removed and color corrected to remove saturated pixels.

Referring back to FIG. 5, at step 504 (i.e., image alignment), a reference image is found for the same vehicle type that is taken from the same camera position and orientation as the damaged vehicle image. Once the input image is aligned to a reference image, the server is able to overlay the two images on top of each other so that the vehicle boundaries within them more or less coincide. This is called image alignment.

In one embodiment, the server starts with a three-dimensional model of the vehicle and finds a two-dimensional projection of the three-dimensional model that best matches the cleaned image of the damaged vehicle. The match is determined in two stages.

In a first stage, "mutual information" between the input image and a template is determined. Mutual information is a statistical measure of similarity of the spatial distributions of the normalized intensities in the two images. In order to find the best match, a sequence of "similarity transformations" are applied to the three-dimensional model and mutual information of the resulting two-dimensional projections is computed until the ones with the maximum mutual information is obtained. The top few templates with the highest mutual information with the damaged image are kept. The top one turns out to not necessarily be the correct template because of the inability of mutual information to sometimes distinguish between front/back and left/right sides of the vehicle.

In a second stage, another statistical measure "cross-correlation" is used to choose among the top few selected templates. Cross-correlation measures different similarity properties of the two images, and therefore, is able to break the tie among the front/back or left/right sides to come up with the correct template.

According to some embodiments, three-dimensional models of various vehicles can be purchased from commercial providers of three-dimensional renderings of objects, including the vehicle manufacturers themselves. Alternatively, the three-dimensional models can be constructed from a collection of two-dimensional images of the vehicle taken prior to occurrence of damage. In one implementation of constructing the three-dimensional model from two dimensional images, first a number of feature points of a certain type, e.g., scale-invariant feature transform (SIFT) are computed in each two-dimensional image. Next, correspondences between similar feature points across images are established. These correspondences determine the mutual geometrical relationships of the two-dimensional images in three-dimensional space using mathematical formulas. These relationships allow us to "stitch" the two-dimensional images together into a three-dimensional model of the vehicle.

At step 506 (i.e., image segmentation), the cleaned image of the damaged vehicle is segmented into vehicle parts, i.e., the boundaries of the vehicle parts are determined and drawn. Segmentation is carried out in order to assess damage on a part-by-part basis, which makes for more robust damage assessment.

First, the reference image is itself segmented. This can be done easily, since commercial three-dimensional models usually come equipped with segmentation into its component parts.

Next, an attempt is made to locate each part present in the reference image within the damaged input image. The initial position of the part is located by simply overlaying the reference image onto the damaged image and projecting the boundary of the part on to the damaged image. This is then shrunk uniformly in order to arrive at an initial contour, which is then evolved along the gradient of an energy function in a manner analogous to the method of background removal until the energy function reaches its minimum, which is regarded as occurring when the contour coincides with the part boundary, where there is a locally large difference in intensity across the contour. In order to prevent one part from "leaking" into another, some embodiments use the part template to define the zone within which the evolving part in the damaged image must be confined to. Some embodiments also apply consistency checks across different parts found to make sure that they do not overlap or are completely absent.

In some embodiments, level set methods can be used to perform image segmentation. In level set methods, a contour of interest is embedded as the zero level set of a level-set function (LSF) $\phi$, where $\phi$ is a function of time t. Initially at t=0, some embodiments choose a seed contour inside the object of interest. For segmentation applications, the energy function is an edge-based geometric active model. The function is defined such that its minimum is reached (therefore, stop evolving) as soon as the zero level set touches the object boundary. In one implementation, the energy function is defined as:

$$\varepsilon_\in(\phi) = \mu \int_\Omega P(|\nabla\phi|)dx + \lambda \int_\Omega g \delta_\in(\phi)|\nabla\phi|dx + \alpha \int_\Omega g H_\in(-\phi)dx.$$

The first term in the energy function c above is the regularization term. The regularization function is defined as:

$$p_2(s) = \begin{cases} \frac{1}{(2\pi)^2}(1-\cos(2\pi s)), & \text{if } s \leq 1 \\ \frac{1}{2}(s-1)^2, & \text{if } s \geq 1. \end{cases}$$

Let I be an image on a domain $\Omega$, and the edge indicator function g is defined as:

$$g \triangleq \frac{1}{1+|\nabla G_\sigma * I|^2}$$

where $G_\sigma$ is a Gaussian smoothing kernel. In some embodiments, the Gaussian kernel is replaced with a non-linear filter that is called a bilateral filter. The filter weights depend not only on Euclidean distance of pixels, but also on the radiometric difference, e.g., pixel grayscale intensity. This preserves sharp edges by systematically looping through each pixel and adjusting weights to the adjacent pixels accordingly.

The second term in the energy functions above is a line integral of the function g along the zero level set of energy function. The other integral part is defined as:

$$\delta_\varepsilon(x) = \begin{cases} \frac{1}{2\varepsilon}\left[1+\cos\left(\frac{\pi x}{\varepsilon}\right)\right], & |x| \leq \varepsilon \\ 0, & |x| > \varepsilon \end{cases}$$

The third term in the energy function $\varepsilon$ above is to speed up the evolution. The function is defined as:

$$H_\varepsilon(x) = \begin{cases} \frac{1}{2}\left(1+\frac{x}{\varepsilon}+\frac{1}{\pi}\sin\left(\frac{\pi x}{\varepsilon}\right)\right), & |x| \leq \varepsilon \\ 1, & x > \varepsilon \\ 0, & x < -\varepsilon. \end{cases}$$

The energy function $\varepsilon$ is minimized by solving the gradient flow:

$$\frac{\partial \phi}{\partial t} = \mu \, div(d_p(|\nabla\phi|)\nabla\phi) + \lambda\delta_\varepsilon(\phi)div\left(g\frac{\nabla\phi}{|\nabla\phi|}\right) + \alpha g \delta_\varepsilon(\phi)$$

At the end of the image segmentation step, each vehicle part present in the image of the damaged vehicle is separately delineated.

At step 508 (i.e., damage assessment), the segmented image of the damaged vehicle and the corresponding reference image are compared for significant differences that are attributable to damage to the vehicle. The reference image can be the image of the same vehicle prior to occurrence of damage or of a commercial 3D model. In order to localize damage, each image is divided into small rectangular regions called "windows" in such a manner that the window boundaries in the two coincide. Within each window the images are compared for edge distribution, texture, and spatial correlation.

For edge distribution, embodiments of the disclosure follow the observation that an undamaged image of a vehicle consists primarily of edges (i.e., straight line segments arising from significant and consistent changes in color and intensity) that are regular in structure and orientation, which are disturbed in the portions where damage has occurred. Embodiments of the disclosure first find edges in the two images using a standard edge finding algorithm, and then compute the distributions of the length and orientations of edges in each window. The distance between the distributions within a window is then computed (using entropy or Kullback-Leibler divergence, for example). If a window exceeds a threshold that is empirically determined, the window may contain damage.

According to one implementation of a method for edge map comparison, the method first computes the edges of each parts using Canny edge detector. Second, the method detects straight lines on the edge maps from all the possible orientations. Then, the method calculates the probability of each orientation having a straight line. Finally, the method checks the entropy difference between template and damage car based on the probability distribution obtained from last step Regarding texture comparison, texture is a way to characterize patterns of intensity changes across an image. In an image of a clean vehicle, each part of the vehicle has a specific texture. When the part is damaged, the part's texture often changes also. Embodiments of the disclosure compute measures of texture such as entropy, derived from locally-oriented intensity gradients for both images in each window and take their difference. If the sum of the magnitudes of differences exceeds an empirically established threshold, the window is regarded as possibly containing damage.

According to one implementation of a method for texture difference detection, first image pairs are transformed to grayscale image. Then, the method computes the co-occurrence matrix for each part. Finally, the method checks the homogeneity difference based on the co-occurrence matrix.

For image correlation, in one the auto-correlation and cross-correlation difference Metric is computed as follows:

$$\text{Metric} = \int_{-\infty}^{\infty}\int_{-\infty}^{\infty}\int_{-\infty}^{\infty}\int_{-\infty}^{\infty} f(x-a,y-b)\{(x,y)-f(x,y)\}dxdydadb$$

In another embodiment, another way to capture differences between patterns of intensity in the damaged and reference images is via spatial correlation, or equivalently, spatial frequency. Some embodiments, compute the spatial frequency components present in the two images in each window. Just as with edges and texture, if they differ appreciably, the window is regarded as a candidate for containing damage.

Figure 10B:
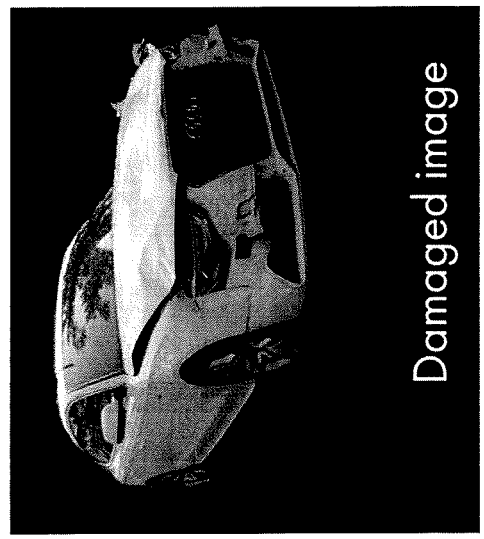
FIG. 10B is an example of an input image of damage to a vehicle, according to one embodiment of the disclosure.
Figure 10A:
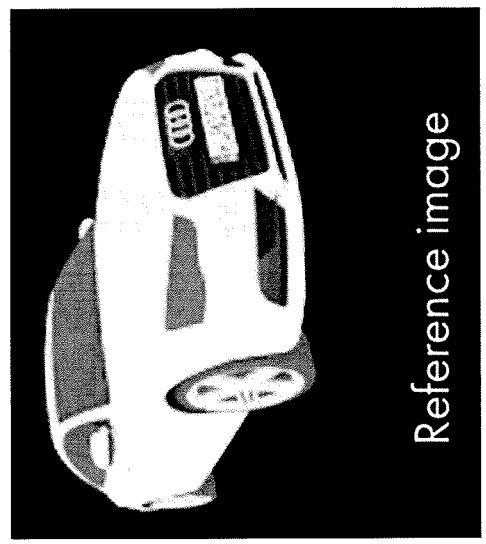
FIG. 10A is an example of a reference image of vehicle, according to one embodiment of the disclosure.

FIG. 10A is an example of a reference image of vehicle, according to one embodiment of the disclosure. FIG. 10B is an example of an input image of damage to a vehicle, according to one embodiment of the disclosure.

As described above, the reference image and input image are divided into segments or "windows," that are compared to one another on the basis of edge distribution, texture, and spatial correlation. These measures of difference between the two images are then combined together for the final determination of damage within each window.

In some embodiments, if more than one measure contributes to the existence of damage, the system asserts that damage within the window exists. The exact proportion of weight assigned to each measure can be determined empirically through testing on real images. The weights can also be determined through supervised machine learning on auto claims data.

Figure 11:
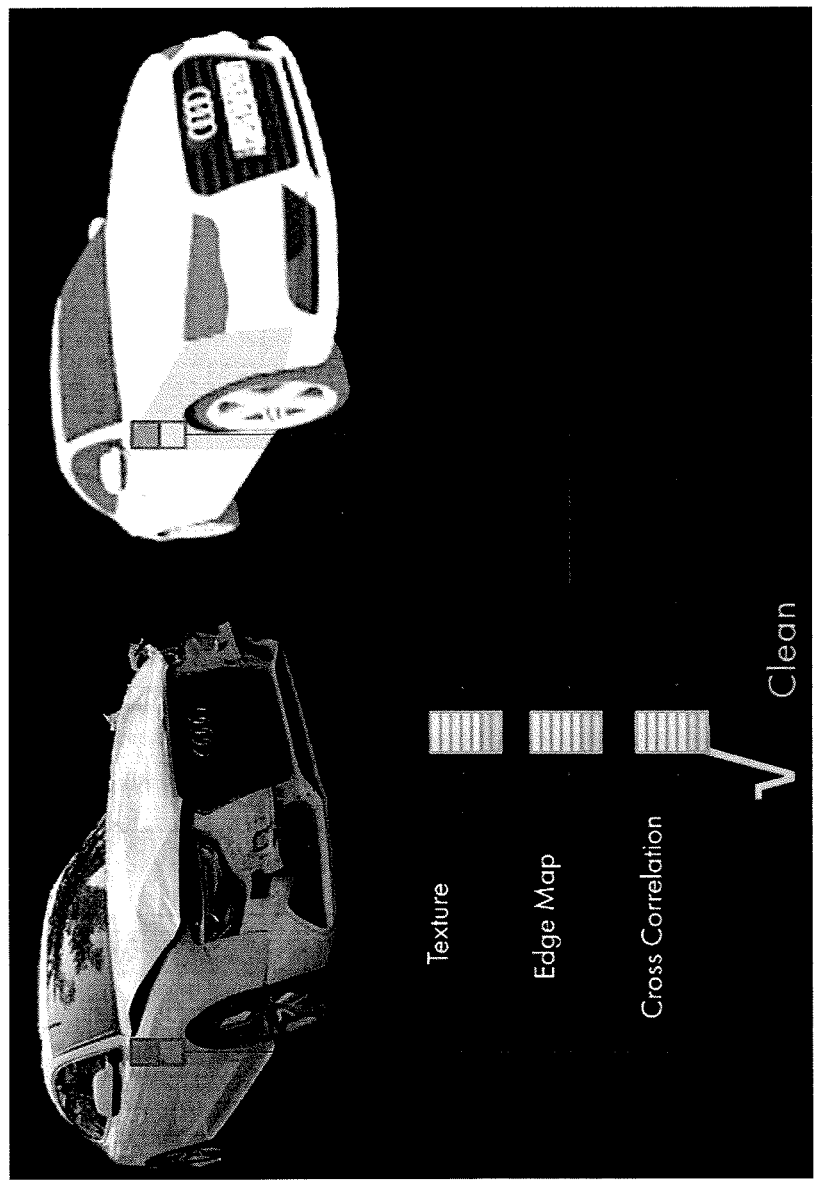
FIG. 11 is a conceptual diagram illustrating comparing a window from a reference image to a corresponding window of an input image where no damage is detected, according to one embodiment of the disclosure.

FIG. 11 is a conceptual diagram illustrating comparing a window from a reference image to a corresponding window of an input image where no damage is detected, according to one embodiment of the disclosure. As shown, for each of edge distribution, texture, and spatial correlation, the difference between the window from the reference image and the window from the input image does not exceed the respective threshold.

Figure 12:
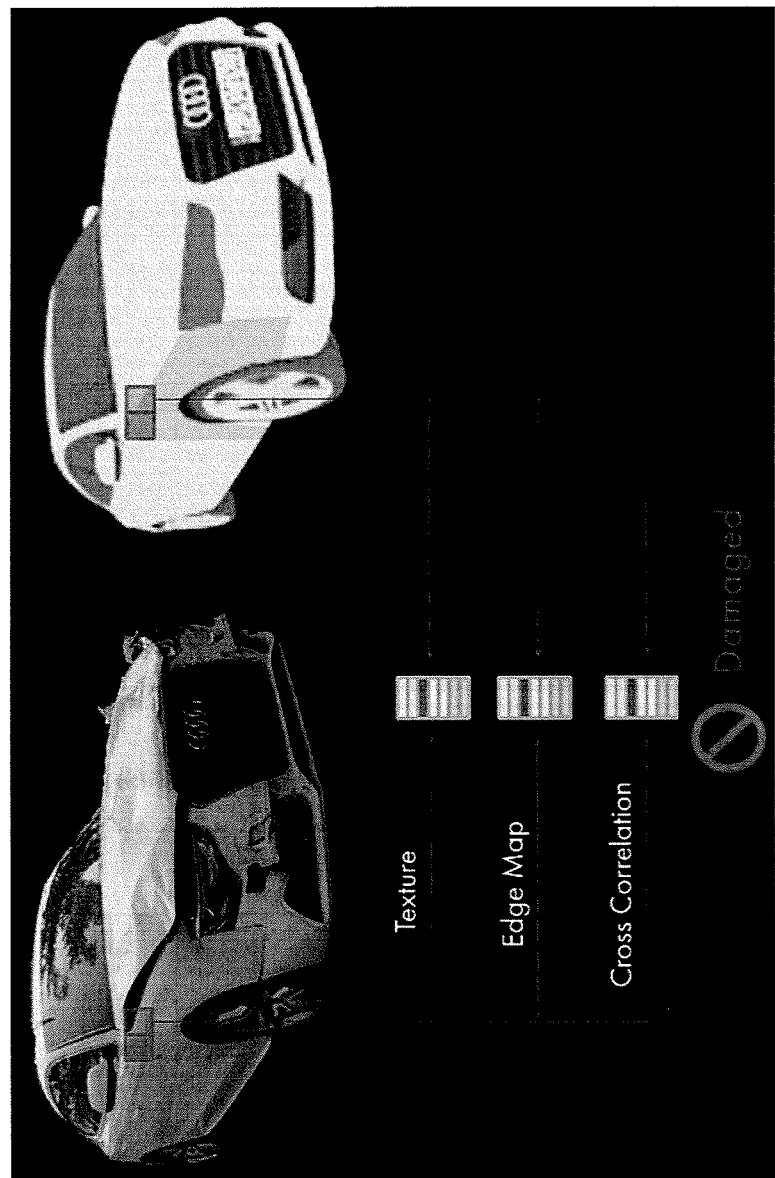
FIG. 12 is a conceptual diagram illustrating comparing a window from a reference image to a corresponding window of an input image where damage is detected, according to one embodiment of the disclosure.

FIG. 12 is a conceptual diagram illustrating comparing a window from a reference image to a corresponding window of an input image where damage is detected, according to one embodiment of the disclosure. As shown, damage is detected since the threshold different from edge distribution, texture, and spatial correlation exceeds the respective threshold. As described, in some embodiments, if one of the metrics exceeds the threshold, then damage is detected. In other embodiments, two or three metrics exceeding the threshold indicate that damage is detected.

Figure 13:
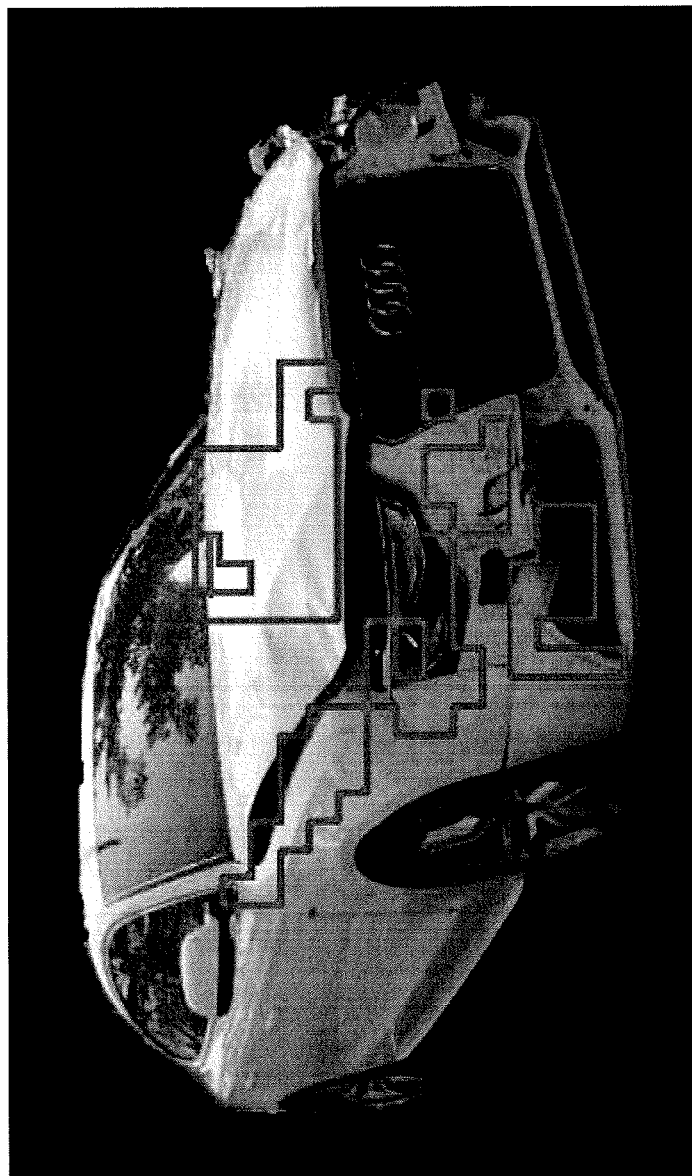
FIG. 13 is a conceptual diagram illustrating the various windows in an input image where damage is detected, according to one embodiment of the disclosure.

FIG. 13 is a conceptual diagram illustrating the various windows in an input image where damage is detected, according to one embodiment of the disclosure. Now that the several indicators of damage within each window have been aggregated, for each vehicle part in the image found during the segmentation step, embodiments of the disclosure compute whether the fraction of "damaged" windows to the total number of windows covering the part exceeds a threshold. If it does, the whole part is declared as damaged. Otherwise, it is not damaged. The "damaged" windows are themselves combined together within their outer boundaries, which can be displayed to show the location of damage within each part, as shown in FIG. 13. The fraction of damaged area can be regarded as an indicator of the severity of damage to the part.

In addition to these "local" measures of damage, some embodiments can also compute the overall shape of each vehicle part in the two images using a shape descriptor, e.g., medial axis, and regard significant difference between the two as further evidence of damage, which can be combined in a weighted manner with the preceding indicators to arrive at the final estimate.

Referring back to FIG. 4, once external damage is detected at step 404, internal damage can be inferred at step 406. Since there is no direct evidence of damage to internal parts from images of the damaged vehicle, embodiments of the disclosure infer damage to internal parts from damage to the external parts. In one implementation, pattern mining large amounts of data of past auto claims can be used to infer damage to the internal parts.

Some embodiments take a large number (e.g., on the order of thousands) of auto claims that contains images of the damaged vehicles and the corresponding appraisals of damaged parts, as found by auto repair shops for repair purposes. Taken together, these historical claims provide enough evidence to establish a high degree of correlation between damage visible in the images and the entire list of damaged parts, both internal and external. In one embodiment, a Convolutional Neural Network (CNN) is trained to learn this correlation. A CNN is a type of mathematical device called a neural network that can be gradually tuned to learn the patterns of correlation between its input and output from being presented a large number of exemplars of input/output pairs called training data. CNNs are configured to take into account the local structure of visual images and invariance properties of objects that are present in them. CNNs have been shown to be highly effective at the task of recognition of objects and their features provided there are enough exemplars of all possible types in the data used to train them. Some embodiments train a CNN to output a complete list of damaged parts when presented with the set of images associated to an auto claim. This includes both internal and external parts. The performance of the CNN can be made more robust when it is presented with the output of the external damage detection system described above. The output of the external damage detection system "primes" the CNN with the information about which external parts are more likely to be damaged, and thereby, increases its accuracy and speed of convergence to the solution.

After both external and internal damaged parts are identified, the system can calculate an estimated repair cost at step 408. To arrive at the estimated cost of parts and labor needed for repairing the vehicle, some embodiments provide the damaged parts list to a database of parts and labor costs. Several such databases exist and are already used by auto repair shops and insurance adjustors on a daily basis once a parts list is identified.

FIGS. 14-21 are screenshots of example interface screens of a vehicle claims application on a client device, according to various embodiments of the disclosure. As described, a vehicle claims application, such as vehicle claims application 218 in FIG. 2, may be used to capture images of a damaged vehicle and upload them to a server for processing.

Figure 16:
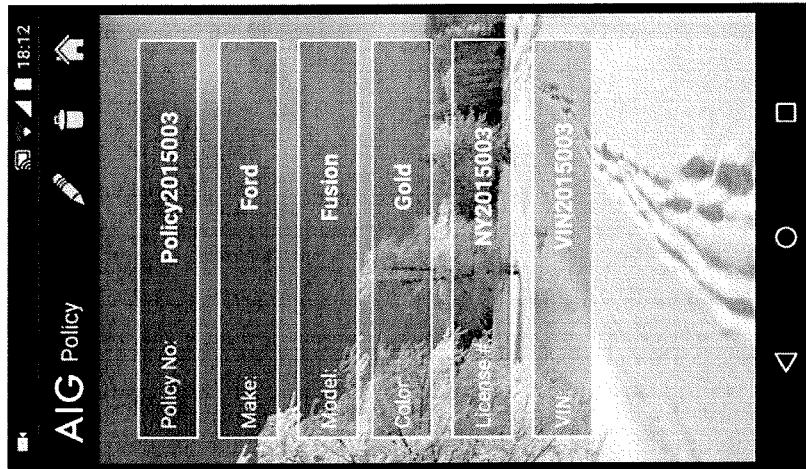
FIGS. 14-21 are screenshots of example interface screens of a vehicle claims application on a client device, according to various embodiments of the disclosure.
Figure 15:
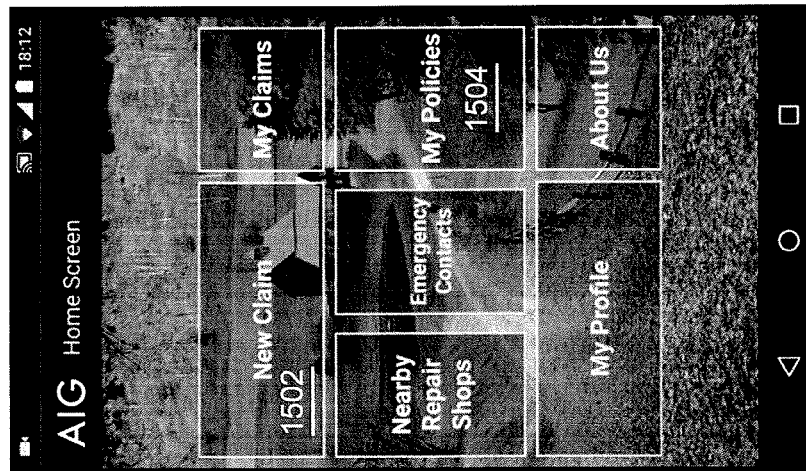
Figure 14:
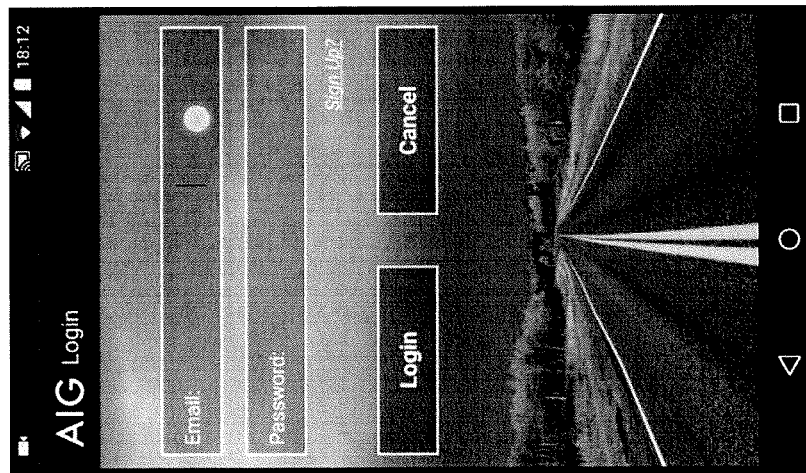

FIG. 14 shows an example log-in screen of vehicle claims application. Once the user is authenticated, a home screen may be displayed, as shown in FIG. 15. Various links can be provided on the home screen to initiate a new claim 1502, review current policies 1504, review prior claims ("My Claims"), find nearby repair shops, view emergency contacts, view the user's profile, and view information about an insurance company ("About Us"). Selecting the current policies 1504 link may display policy information, as shown in FIG. 16.

Figure 17:
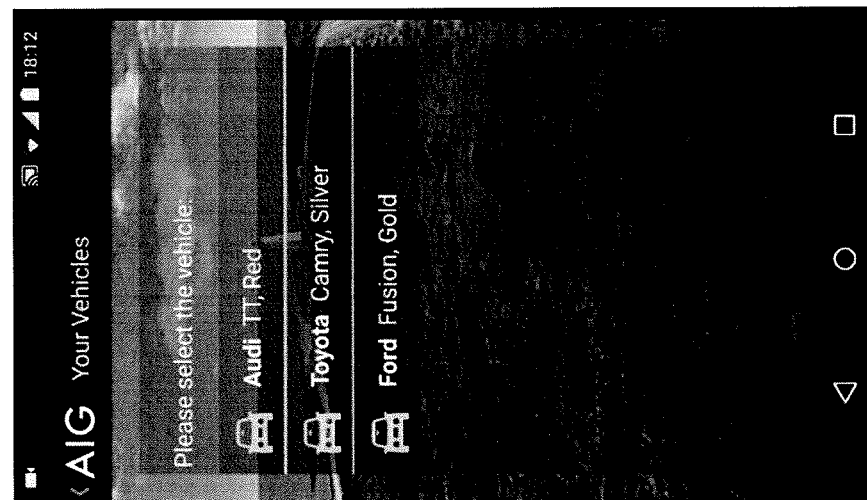
Figure 18:
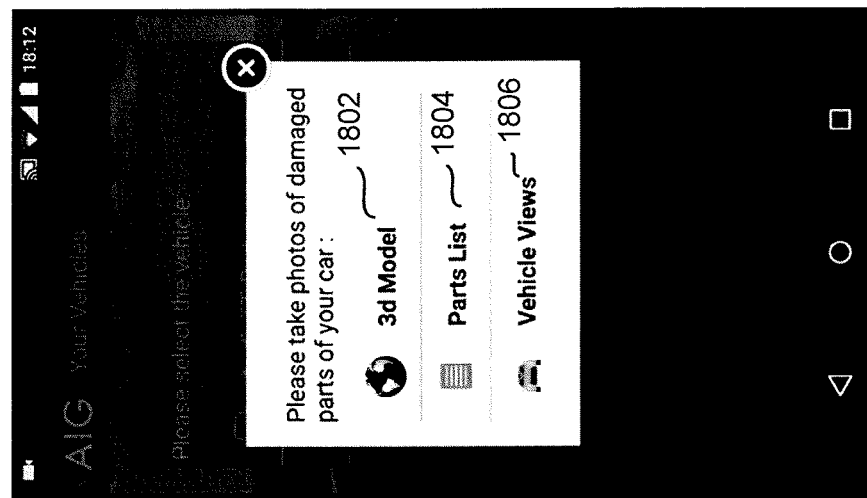

If the user selects the new claim 1502 link, the interface in FIG. 17 may be shown. If there are multiple vehicles insured, the user is asked to select which vehicle to which the new claim relates. Once a vehicle is selected, the interface in FIG. 18 may be displayed, where the user is prompted to take photos of the damaged parts of the vehicle. The vehicle claims application may prompt the user for certain photos using a three-dimensional (3d) model 1802, a parts list 1804, and vehicle views 1806.

Figure 19C:
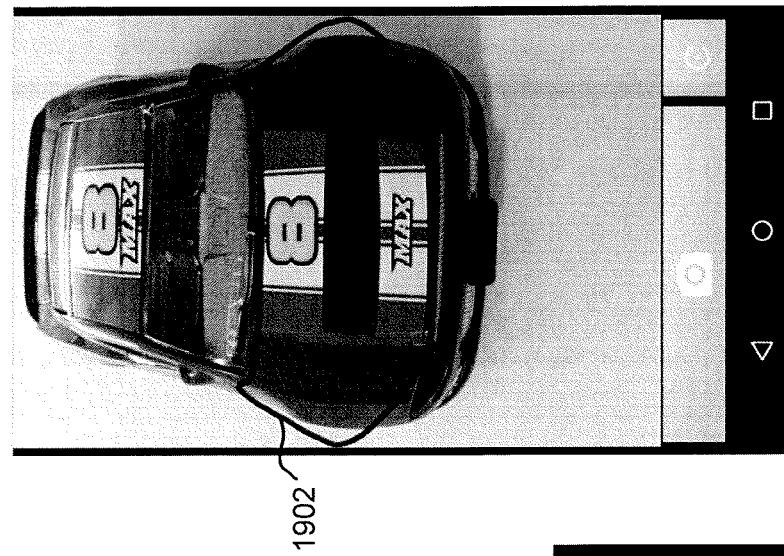
Figure 19B:
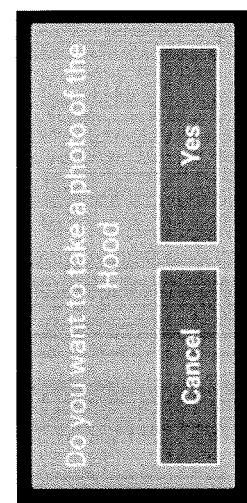
Figure 19A:
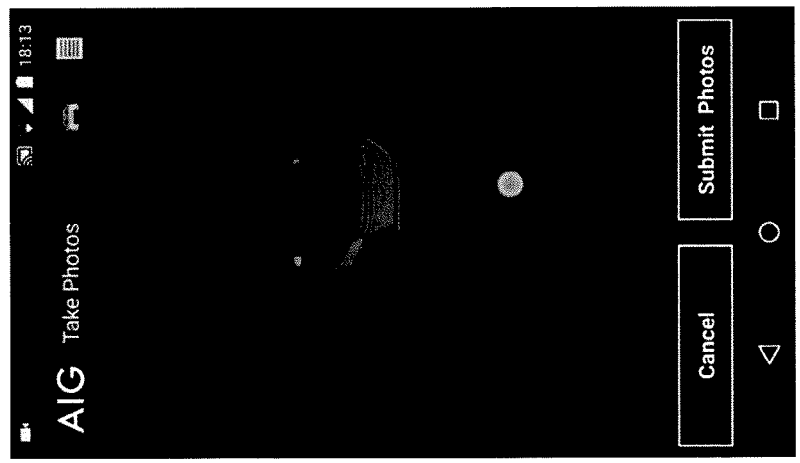

If the user selects to be prompted by a 3d model 1802, the interface in FIG. 19A may be displayed. A 3d model of the user's vehicle is displayed and the user is prompted to tap on the portion of the vehicle that is damaged. For example, the user may tap on the hood of the vehicle, which causes an interface such as the one shown in FIG. 19B to be displayed. If the user selects "Yes" in the prompt in FIG. 19B, the interface in FIG. 19C may be displayed. In FIG. 19C, an outline 1902 is displayed for the hood of the vehicle superimposed on a live camera view from the client device. The user can then position the camera of the client device so that the hood of the car aligns with the outline 1902. Once the hood of the car aligns with the outline 1902, a photo is captured, either automatically by the camera or manually by the user selecting a capture button. The user can be prompted in this manner to capture photos of all damaged parts using a 3d model of the vehicle.

Figure 20B:
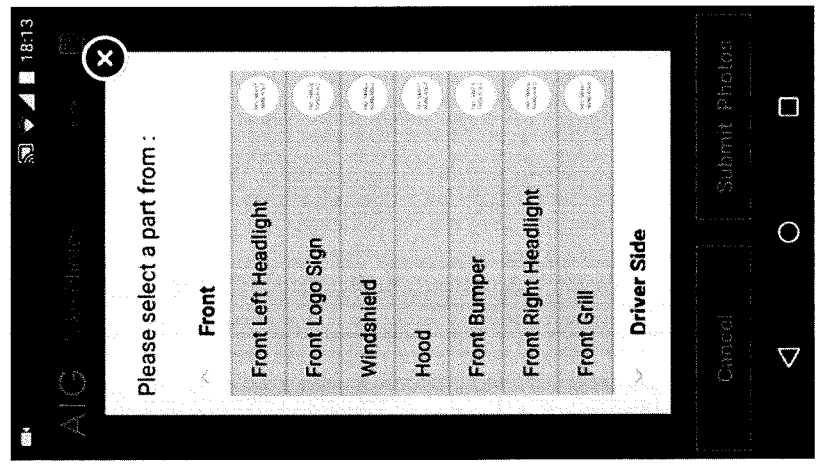
Figure 20A:
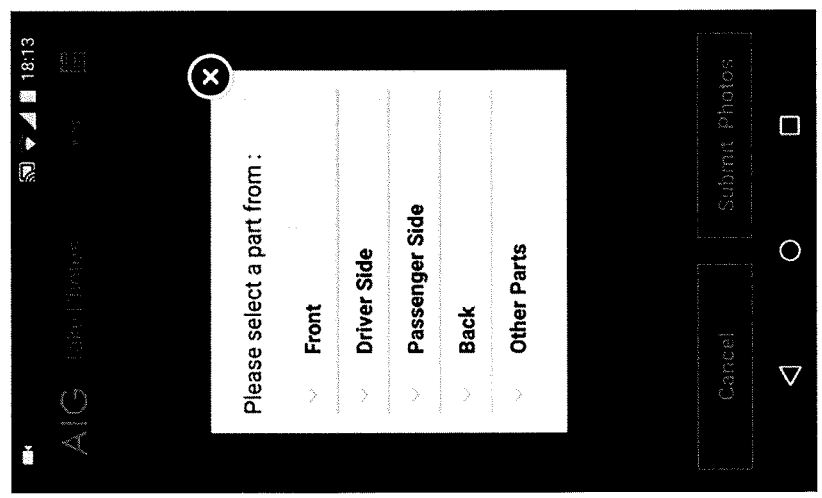

If instead the user selects to be prompted by a parts list 1804, the interface in FIG. 20A may be displayed. The user is first prompted to select general section of the vehicle that sustained damage. Suppose the user select "Front" from the interface shown in FIG. 20A, which causes the interface shown in FIG. 20B to be displayed. The user is then prompted to select a more specific section or part of the vehicle that sustained damage. Once the user makes a selection, an outline for that part is displayed (similar to the outline 1902 in FIG. 19C), and the client device proceeds to capture the requisite photo.

Figure 21:
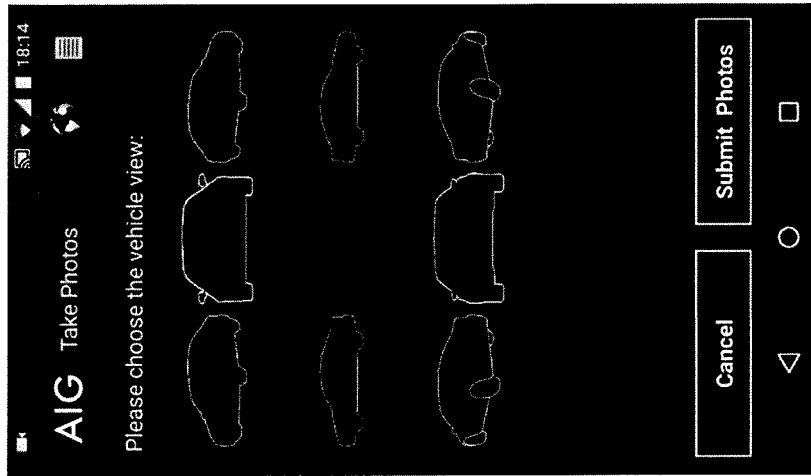

If instead the user selects to be prompted by vehicle views 1806, the interface in FIG. 21 may be displayed. The user is prompted to capture photos of eight views of the vehicle, for example: front-left perspective, front plan, front-right perspective, left plan, right plan, rear-left perspective, rear plan, rear-right perspective. In other implementations, different views may be requested.

Once the user captures the images of the damaged vehicle using the prompts provided by the vehicle claims application, the images are uploaded to a server over a network. The server is then configured to perform image processing operations on the images to identify damaged external parts, infer damaged internal parts, and estimate repair costs, as described above.

Figure 22:
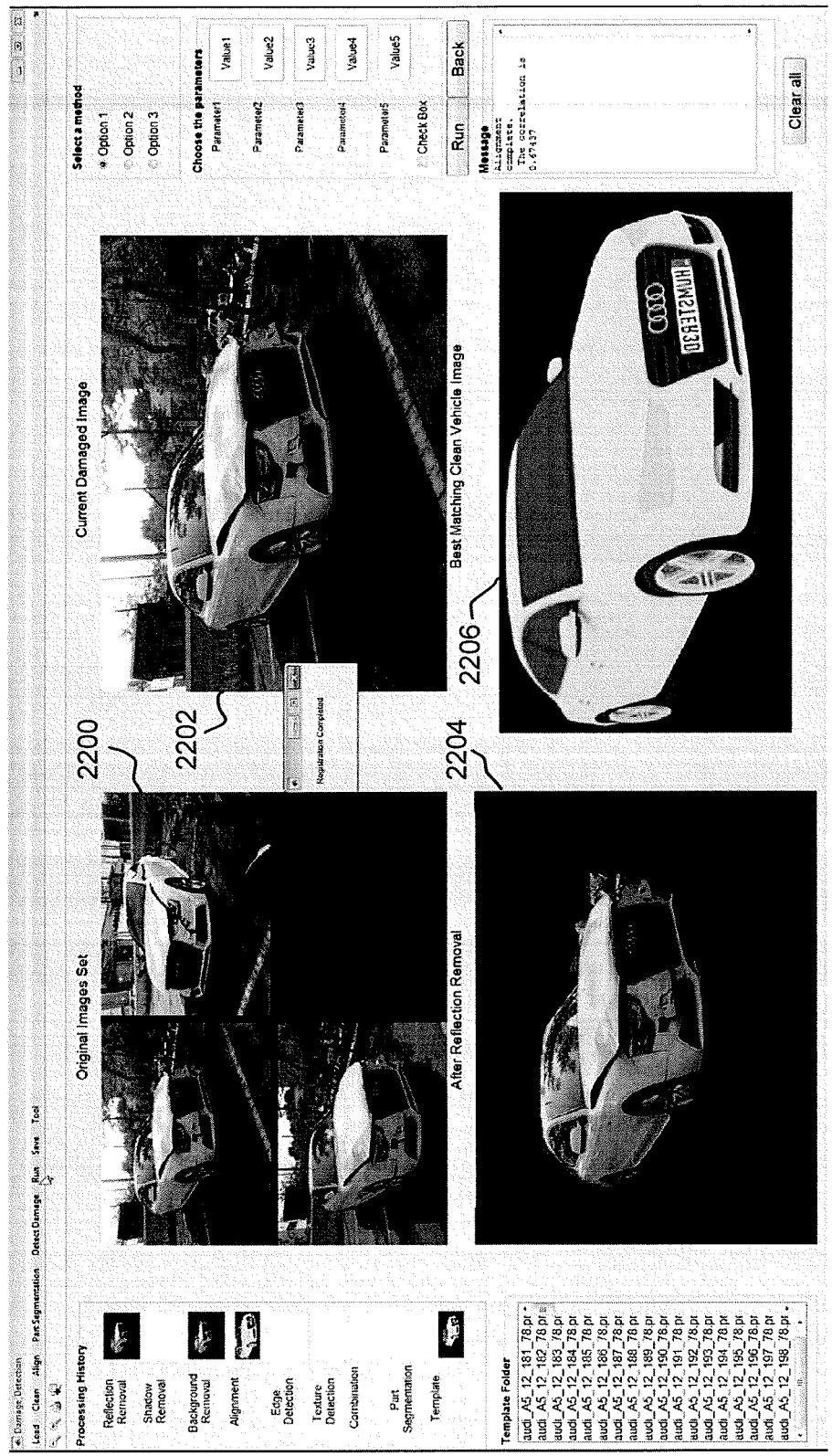
FIG. 22 is a screenshot of an example interface screen of an adjuster computing device connected via a communications interface to a server configured to automatically estimate repair costs, according to one embodiment of the disclosure.

FIG. 22 is a screenshot of an example interface screen of an adjuster computing device connected via a communications interface to a server configured to automatically estimate repair costs, according to one embodiment of the disclosure. In FIG. 22, in portion 2200 of the interface, the original images uploaded to the server are shown. In this example, three images have been received by the server. Each of the three images is processes separately. In portion 2202, the image currently being processed is displayed. In portion 2204, the image after background and specular reflection removal is shown. In portion 2206, the clean reference image is shown aligned with the image shown in portion 2204. Using the techniques described herein, the image shown in portion 2204 is compared to the image shown in portion 2206 to identify the external parts that are damaged, from which internal parts are inferred, and total repair costs are estimated.

In some embodiments, in order to assist the adjustors to make decisions quickly and easily using the output of the disclosed automated system, damaged area in each input image are marked in a contrasting color. Also, a label can be put onto the damaged part. Some embodiments then project the images onto the 3D model of the vehicle using the camera angles determined during the alignment process. The 3D model then shows the damage to the vehicle in an integrated manner. The adjustor can rotate and zoom in on the 3D model as desired. When the adjustor clicks on a damaged part, the interface may show all the original images that contain that part on the side, so that the adjustor can easily examine in the original images where the damage was identified.

Figure 23:
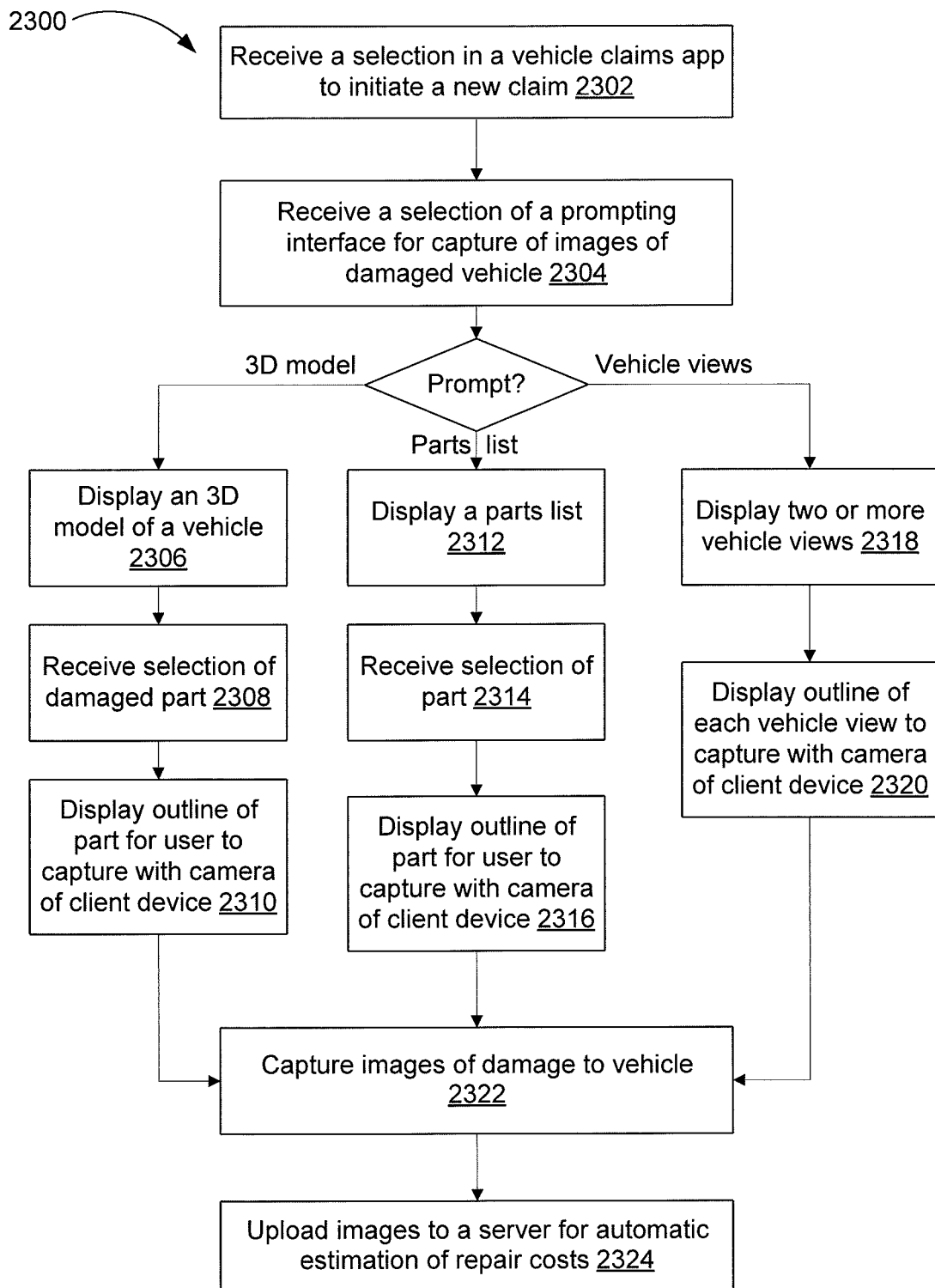
FIG. 23 is a flow diagram of method steps for a vehicle claims application to prompt a client device to capture images of a damaged vehicle, according to one embodiment of the disclosure.

FIG. 23 is a flow diagram of method steps for a vehicle claims application to prompt a client device to capture images of a damaged vehicle, according to one embodiment of the disclosure. At step 2302, the vehicle claims application receives a selection to initiate a new claim. At step 2304, the vehicle claims application At step 2304, the vehicle claims application receives a selection of a prompting interface for capture of images of damaged vehicle.

If the prompting interface is to capture images using a 3D model of the vehicle, at step 2306, the vehicle claims application displays a 3D model of the vehicle. At step 2308, the vehicle claims application receives a selection of a damaged part on the 3D model. At step 2310, the vehicle claims application displays an outline of the selected part for a user to capture with a camera of the client device.

If the prompting interface is to capture images using a parts list of the vehicle, at step 2312, the vehicle claims application displays a parts list. At step 2314, the vehicle claims application receives a selection of part and, at step 2316, displays an outline of the part for the user to capture with the camera of the client device.

If the prompting interface is to capture images using vehicle views, at step 2318, the vehicle claims application displays two or more vehicle views and, at step 2320, displays an outline for each vehicle view to capture with the camera of the client device.

At step 2322, the vehicle claims application capture images of damage to vehicle using the camera of the client device. At step 2324, the vehicle claims application uploads the captured images to a server for automatic estimation of repair costs.

In another implementation of the automatic vehicle damage assessment (AVDA) system, rather than comparing photos of a damaged vehicle to an undamaged version, another embodiment of the disclosure relies upon machine learning methods to learn patterns of vehicle damage from a large number of auto claims in order to predict damage for a new claim. In general, machine learning systems are systems that use "training data" to "learn" to associate their input with a desired output. Learning is done by changing parameters of the system until the system outputs results as close to the desired outputs as possible. Once such a machine system has learned the input-output relationship from the training data, the machine learning system can be used to predict the output upon receiving a new input for which the output may not be known. The larger the training data set and the more representative of the input space, the better the machine learning system performs on the prediction task.

Some embodiments use machine learning to perform the task of prediction of vehicle damage from an auto claim. Thousands of historical auto claims are stored in one or more databases, such as database 110 in FIG. 1, for training and testing of the disclosed system. The database also stored auto claim images and other pieces of information that come with a claim, such as vehicle make, model, color, age, and current market value, for example. The desired output of the disclosed machine learning system is the damage appraisal as prepared by a repair shop consisting of a list of parts that were repaired or replaced and the corresponding costs of repair, both for parts and labor. Another desired output is the determination of the loss type, namely, total loss, medium loss, or small loss, for example.

Figure 24:
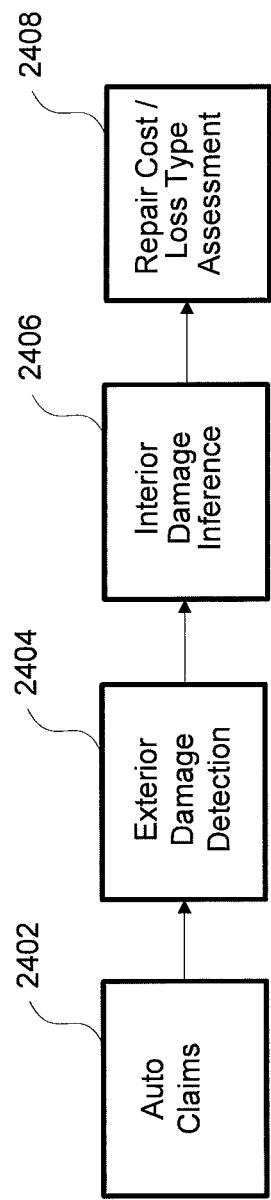
FIG. 24 is a block diagram illustrating a multi-stage design of a machine learning system, according to one embodiment.

FIG. 24 is a block diagram illustrating a multi-stage design of a machine learning system, according to one embodiment. At stage 2402, claims data for thousands of auto claims is input into the machine learning system. The machine learning system is executed by one or more computing devices, such as servers 102 in FIG. 1.

At stage 2404, the machine learning system uses a machine learning method called Convolutional Neural Network (CNN) to detect external damage. A CNN is a type of machine learning method called an artificial neural network. A CNN is specially designed for image inputs based on analogy with the human visual system. A CNN consists of a number of layers of "neurons" or "feature maps," also called convolution layers, followed by a number of layers called fully connected layers. The output of a feature map is called a feature. In the convolution layers, the CNN extracts the essential aspects of an image in a progressively hierarchical fashion (i.e., from simple to complex) by combinatorially combining features from the previous layer in the next layer through a weighted non-linear function. In the fully connected layers, the CNN then associates the most complex features of the image computed by the last convolution layer with any desired output type, e.g., a damaged parts list, by outputting a non-linear weighted function of the features. The various weights are adjusted during training, by comparing the actual output of the network with the desired output and using a measure of their difference ("loss function") to calculate the amount of change in weights using the well-known backpropagation algorithm. Additional implementation details of the CNNs of the disclosed machine learning system are described in detail below.

At stage 2406, the machine learning system predicts damage to the interior parts of the vehicle from the exterior damage assessment output by stage 2404. Some embodiments employ a Markov Random Field (MRF). An MRF defines a joint probability distribution over a number of random variables whose mutual dependence structure is captured by an undirected (mathematical) graph. The graph includes one node for each random variable. If two nodes are connected by an edge, then the corresponding random variables are mutually dependent. The MRF joint distribution can be written as a product of factors, one each of a maximal clique (i.e., a maximal fully connected subgraph) in the graph. Additional implementations details of an MRF of the disclosed machine learning system are described in detail below.

At stage 2408, after the list of both exterior and interior damaged parts has been prepared, the machine learning system prepares a repair cost appraisal for the vehicle by looking up the damaged parts and labor cost in a database. The damaged parts list can be compared to a list of previously damaged parts prior to the occurrence of the current damage, and a final list of newly damaged parts is determined through subtraction of previously damaged parts. Some embodiments also take into account the geographical location, age of the vehicle, and other factors.

Additionally, some embodiments can classify a claim into categories as a total, medium, or small loss claim by taking the damaged parts list, repair cost estimation, and current age and monetary value of the vehicle as input to a classifier whose output is the loss type which takes the three values—total, medium and small. Any machine learning technique can be used for the classifier, e.g., logistic regression, decision tree, artificial neural network, support vector machines (SVM), and bagging. First, the system is trained on historical claims for which the outcome is known. Once the system parameters have been to achieve a desired degree of accuracy on a test set, the system can be used to perform the loss classification.

CNN Implementation

As described, a CNN is a type of machine learning method called an artificial neural network. A CNN consists of a number of layers of "neurons" or "feature maps," also called convolution layers, followed by a number of layers called fully connected layers. The output of a feature map is called a feature. In the convolution layers, the CNN extracts the essential aspects of an image in a progressively hierarchical fashion (i.e., from simple to complex) by combinatorially combining features from the previous layer in the next layer through a weighted non-linear function. In the fully connected layers, the CNN then associates the most complex features of the image computed by the last convolution layer with any desired output type, e.g., a damaged parts list, by outputting a non-linear weighted function of the features. The various weights are adjusted during training, by comparing the actual output of the network with the desired output and using a measure of their difference ("loss function") to calculate the amount of change in weights using the well-known backpropagation algorithm.

A "loss function" quantifies how far a current output of the CNN is from the desired output. The CNNs in some of the disclosed embodiments perform classification tasks. In other words, the desired output is one of several classes (e.g., damaged vs. non-damaged for a vehicle part). The output of the network is interpreted as a probability distribution over the classes. In implementation, the CNN can use a categorical cross-entropy function to measure the loss using the following equation:

$$H(p,q) = -\Sigma_x p(x) \log(q(x))$$

where p is a true distribution over classes for a given input x, and q is the output from the CNN for input x. The loss will be small if p and q are close to each other.

In a first example, if we do positive and negative classification, and q=[0.1 0.9] and p=[0 1], then $H_1$=0.1. In a second example, if we do positive and negative classification, and q=[0.9 0.1] and p=[0 1], then $H_2$=2.3.

As described, a CNN is made up of layers. Each layer includes many "nodes" or "neurons" or "feature maps." Each neuron has a simple task: it transforms its input to its output as a non-linear function, usually a sigmoid or a rectified linear unit, of weighted linear combination of its input. Some embodiments of the disclosure use a rectified linear unit. A CNN has four different types of layers:

1. "Input layer" that holds the raw pixel values of input images.
2. "Convolutional layer" (Cony) that computes its output by taking a small rectangular portion of its input ("window") and applying the non-linear weighted linear combination.
3. "Pooling layer" (Pool) that takes a rectangular portion of its input ("window") and computes either the maximum or average of the input in that window. Embodiments of the disclosure use the maximum operation. This layer reduces the input sizes by combining many input elements into one.
4. "Fully connected layer" (FC), where each neuron in this layer will be connected to all the numbers in the previous volume. The output is a non-linear weighted linear combination of its input.

The parameters of a CNN are:
Number of layers
Number of neurons in each layer
Size of the window in each convolution and pooling layer
Weight vectors for each neuron in each layer
The parameters of the non-linearity used (the slope of the rectified linear unit in our case)

Of these, the weight vectors for each neuron in each layer are the ones adjusted during training. The rest of the weight vectors, once chosen, remain fixed. For example, Table 1 below provides an examples of the number of parameters of used in one implementation for detection of damage to the front bumper:

TABLE 1

| CNN parameters | Representation size | Weights |
|---|---|---|
| Input: | [240 × 320 × 3] | 0 |
| Conv1-64 neurons | [240 × 320 × 64] | (5 * 5 * 5) * 64 = 8000 |

TABLE 1-continued

| CNN parameters | Representation size | Weights |
|---|---|---|
| Pool1 | [120 × 160 × 64] | 0 |
| Conv2-64 neurons | [120 × 160 × 64] | (5 * 5 * 64) * 64 = 102,400 |
| Pool2 | [60 × 80 × 64] | 0 |
| Conv3-64 neurons | [60 × 80 × 64] | (5 * 5 * 64) * 64 = 102,400 |
| Pool3 | [30 × 40 × 64] | 0 |
| FC1-256 neurons | [1 × 1 × 256] | 30 * 40 * 64 * 256 = 19,660,800 |
| FC2-256 neurons | [1 × 1 × 256] | 256 * 256 = 65,536 |
| FC3-2 neurons | [1 × 1 × 2] | 256 * 10 = 2,560 |

CNN Training

The weight parameters of a CNN can be adjusted during the training phase using a back-propagation algorithm as follows:

```
initialize the network weights with small random values
    do
        for each image x in the training set
            prediction = compute the output of the network, q(x);  // forward pass
            actual = desired output of the network, p(x);
            compute loss = H(p,q) = - Σ_x p(x) log(q(x)) for the batch;
            compute Δw_h = derivative of loss with respect to weight w__h for
allweights from hidden layer to output layer;  // backward pass
            add Δw_h to the current weights to get new weights;
    until loss on the training set drops below a threshold
    return the network as trained
```

Figure 25:
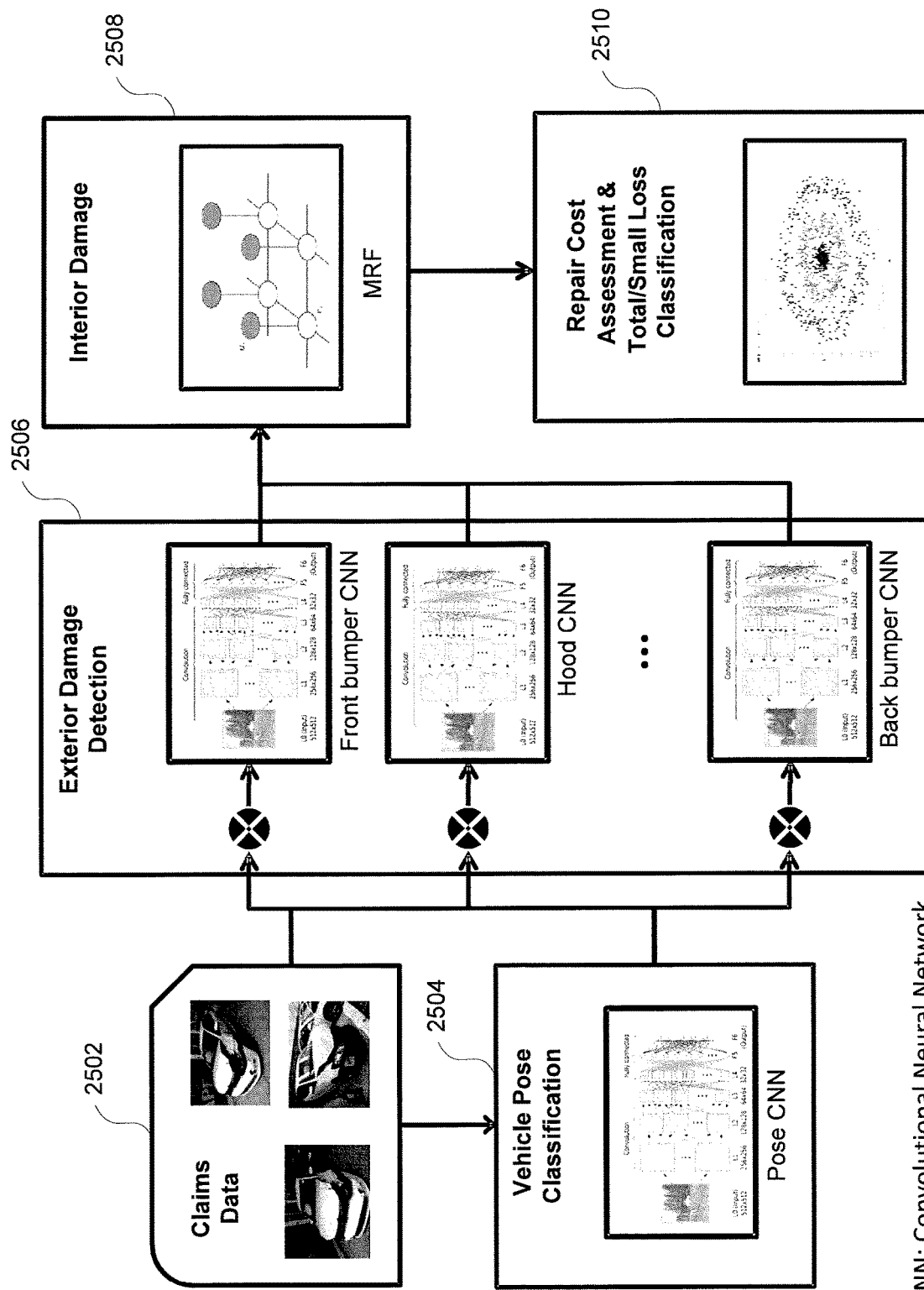
FIG. 25 is a block diagram illustrating implementation of Convolutional Neural Networks (CNNs) to detect vehicle damage, according to one embodiment.

FIG. 25 is a block diagram illustrating implementation of Convolutional Neural Networks (CNNs) to detect vehicle damage, according to one embodiment. In one implementation of the system, labeled images are input to a CNN and the damaged parts list as the desired output. In another implementation, the input-output association problem is broken down into several sub-problems, each of which is easier for a machine learning system than the full problem, as shown in FIG. 15.

Claims data 2502 for thousands or millions of auto claims is input into the exterior damage detection engine 2506. For a given claim for which vehicle damage is to be detected, the claims data is also passed to a vehicle pose classification engine 2504.

The vehicle pose classification engine 2504 uses a CNN to first predict the pose of the vehicle. The output of this CNN is one of eight (8) pose categories. For vehicles, the 8 categories may correspond to the eight (8) non-overlapping 45-degree sectors around the vehicle, i.e., front, left front corner, left side, back front corner, back, back right corner, right side, and right front sector. The CNN of the vehicle pose classification engine 2504 can be trained on a large number of auto claim images that have manually been labeled with the appropriate pose category.

In the exterior damage detection engine 2506, in one implementation, there is one CNN for each of the exterior vehicle parts, trained to predict damage to that part. In one implementation, a vehicle is divided up into twenty-four (24) exterior parts, and thus, twenty-four (24) vehicle part CNNs, including:

Pr1='Front Bumper';
Pr2='Back Bumper';
Pr3='Front Windshield';
Pr4='Back Windshield';
Pr5='Hood';
Pr6='Car Top';
Pr7='Front Grill';
Pr8='Left Front Fender';
Pr9='Left Front Headlight';
Pr10='Left Side';
Pr11='Left Back Headlight';
Pr12='Left Front Window';
Pr13='Left Back Window';
Pr14='Left Front Door';
Pr15='Left Back Door';
Pr16='Right Front Fender';
Pr17='Right Front Headlight';
Pr18='Right Side';
Pr19='Right Back Headlight';
Pr20='Right Front Window';
Pr21='Right Back Window';
Pr22='Right Front Door';
Pr23='Right Back Door'; and
Pr24='Trunk'.

These CNNs can be trained on the auto claims images 2502, which have been labeled with an indication of damage to each exterior part visible in the images.

After the pose category has been predicted by the vehicle pose classification engine 2504 for a given input image, the image is presented to each of the external part CNNs of the exterior damage detection engine 2506. In one implementation, each CNN of the exterior damage detection engine 2506 corresponds to an external part that is potentially visible from that pose. Thus, a part CNN sees only those images at its input that can have the part present in that post. This reduces the burden on the vehicle part CNNs in the exterior damage detection engine 2506, while increasing their accuracy since they receive only the images relevant to the given vehicle part CNN.

After all the images in a claim have been presented to the exterior damage detection engine 2506, the machine learning system has a prediction for damage to each of the exterior parts that we can infer from the collection of images for the claim.

This information is passed from the exterior damage detection engine 2506 to the interior damage engine 2508. The interior damage engine 2508 predicts damage to the interior parts of the vehicle from the exterior damage assessment output by the exterior damage detection engine 2506. One implementation employs a Markov Random Field (MRF) in the interior damage engine 2508. An MRF defines a joint probability distribution over a number of random variables whose mutual dependence structure is captured by an undirected (mathematical) graph. The graph includes one node for each random variable. If two nodes are connected by an edge, the corresponding random variables are mutually dependent. The MRF joint distribution can be written as a product of factors, one each of a maximal clique (a maximal fully connected subgraph) in the graph.

In one implementation, there is one random variable for damage level of each of the vehicle parts. The nodes corresponding to a pair of parts are connected by an edge if they are neighboring parts, since damage to one is likely to result in damage to the other. A probability distribution is defined on these random variables that specifies the probability for each subset of the parts that that subset is damaged while its complement is not damaged.

From the output of the exterior damage detection engine 2506, we can assign values to the random variables corresponding to the exterior parts. The values of the random variables corresponding to the interior parts can then inferred by choosing values that result in maximum joint probability for the exterior and interior damaged parts. The inference can be carried out using a belief propagation algorithm.

The joint probability distribution over all the random variables p(y|θ) can first be written as due to the Hammersley-Clifford theorem, as follows:

$$p(y|\theta) = \frac{1}{Z(\theta)} \prod_{c \in C} \psi_c(y_c|\theta_c)$$

Here, c is a maximal clique and $\theta_c$ are some parameters associated with the maxical clique. The potential functions $\psi_c$ are chosen as exponential functions of weighted linear combinations of the parameters $\theta_c$ as:

$$\log \psi_c(y_c) \triangleq \phi_{cv}(y_c)^T \theta_c$$

In one implementation, φc is identity. During training, the parameters $\theta_c$ are adjusted as follows: for any given auto claim, values of the variables yc corresponding to the exterior and interior parts are clamped at their true values. The values of the parameters $\theta_c$ are chosen to then maximize the probability p(y|θ). This is repeated over the entire set of training images until values of $\theta_c$ settle down to more or less fixed values. These final values are taken as the values of the parameters $\theta_c$ for prediction of damage to interior parts.

The MRF is used to predict damage to interior parts as follows: given a new claim the values of yc corresponding to the exterior parts are fixed at the outputs of the corresponding part CNNs. The values of yc corresponding to interior parts are then chosen to maximize the probability p(y|θ). For any interior parts if yc exceeds a pre-defined threshold, it is regarded as damaged. Otherwise it is regarded as undamaged.

The external an internal damage estimates are then passed to a cost estimation engine 2510. The cost estimation engine 2510 can look up in a database the corresponding cost for repair or replacement of each of the external and internal parts based on make, model, year, and color of the vehicle. Some embodiments also take into account the geographic location of the vehicle, as costs may vary by state or region.

Additionally, some embodiments can classify a claim into categories as a total, medium, or small loss claim by taking the damaged parts list, repair cost estimation, and current age and monetary value of the vehicle as input to a classifier whose output is the loss type which takes the three values—total, medium and small. Any machine learning technique can be used for the classifier, e.g., logistic regression, decision tree, artificial neural network. First, the system is trained on historical claims for which the outcome is known. Once the system parameters have been to achieve a desired degree of accuracy on a test set, the system can be used to perform the loss classification.

Figure 26:
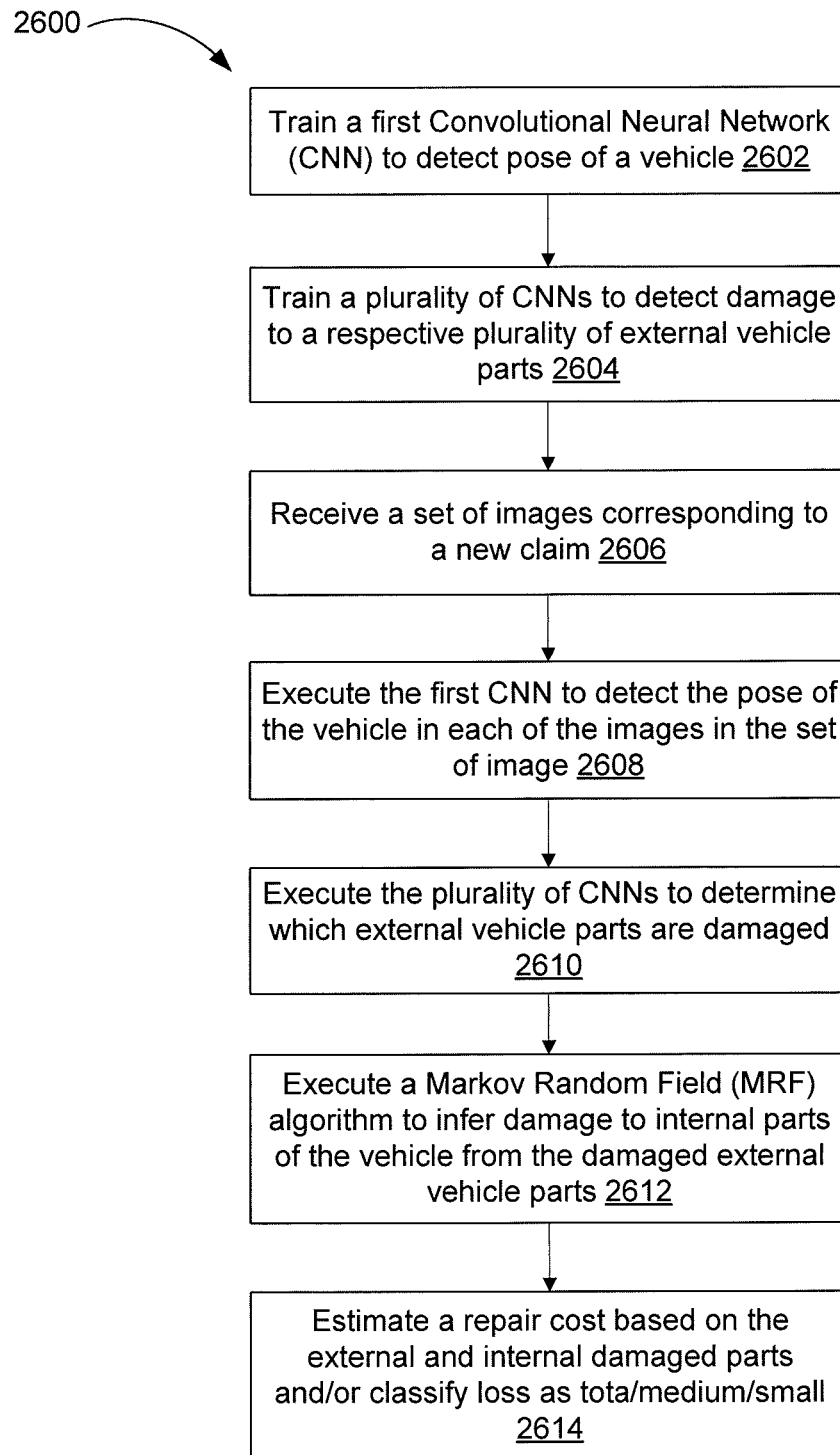
FIG. 26 is a flow diagram of method steps for estimating vehicle damage from images of a damaged vehicle using a machine learning algorithm, according to one embodiment.

FIG. 26 is a flow diagram of method steps for estimating vehicle damage from images of a damaged vehicle using a machine learning algorithm, according to one embodiment. As shown, the method 2600 begins at step 2602, where a server computing device trains a first Convolutional Neural Network (CNN) to detect pose of a vehicle. At step 2604, the server computing device trains a plurality of CNNs to detect damage to a respective plurality of external vehicle parts 2604. At step 2606, the server computing device receives a set of images corresponding to a new claim. At step 2608, the server computing device executes the first CNN to detect the pose of the vehicle in each of the images in the set of image. At step 2610, the server computing device executes the plurality of CNNs to determine which external vehicle parts are damaged. At step 2612, the server computing device executes a Markov Random Field (MRF) algorithm to infer damage to internal parts of the vehicle from the damaged external vehicle parts. At step 2614, the server computing device estimates a repair cost based on the external and internal damaged parts. Additionally, in some embodiments, at step 2614, the server computing device may classify the loss as a total, medium, or small loss, as described above.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for automatically estimating a repair cost for a vehicle, comprising:
   receiving, at a server computing device over an electronic network, one or more images of a damaged vehicle from a client computing device;

removing artifacts from a first image of the one or more images;
aligning the first image to an undamaged version of the vehicle;
segmenting the first image into vehicle parts; and
detecting damage to a set of parts of the vehicle by comparing portions of each vehicle part in the first image to corresponding portions of each vehicle part in the undamaged version of the vehicle, wherein detecting damage to the set of parts includes:
comparing each of edge distribution, texture comparison, and spatial correlation of portions of each vehicle part in the first image to corresponding portions of each vehicle part in the undamaged version of the vehicle, and
determining whether each of the edge distribution, the texture comparison, and the spatial correlation exceed respective threshold difference values, wherein damage is detected in a portion of a vehicle part in the first image if at least two of the edge distribution, the texture comparison, and the spatial correlation exceed the respective threshold difference value;
training a first Convolutional Neural Network (CNN) to detect a pose of a vehicle in an input image;
training a plurality of CNNs to detect damage to a respective plurality of external vehicle parts;
executing the first CNN to detect the pose of the vehicle in the first image;
executing the plurality of CNNs to determine which external vehicle parts are damaged in the first image; and
executing a Markov Random Field (MRF) algorithm to infer damage to internal parts of the vehicle from the determined damaged external vehicle parts; and
calculating an estimated repair cost for the vehicle based on the detected damage based on accessing a parts database that includes repair costs.

2. The method of claim 1, wherein said parts database that includes repair costs includes estimates for parts and labor for individual parts.

3. The method of claim 1, wherein removing artifacts from the first image includes:
removing background material from the first image; and
removing specular reflection due to incident light on the vehicle shown in the first image.

4. A system for estimating a repair cost for a vehicle, comprising:
a client computing device configured to:
display one or more prompts on a display device of the client computing device to capture a portion of the vehicle that has sustained damage,
capture an image of the vehicle based on displaying an outline of the portion of the vehicle, and
transmit the image of the vehicle to a server computing device; and
the server computing device configured to:
receive the image over an electronic communications network from the client computing device,
remove artifacts from the image;
align the image to an undamaged version of the vehicle;
segment the image into vehicle parts; and
detect damage to a set of parts of the vehicle by comparing portions of each vehicle part in the image to corresponding portions of each vehicle part in the undamaged version of the vehicle, wherein detecting damage to the set of parts includes:
comparing each of edge distribution, texture comparison, and spatial correlation of portions of each vehicle part in the image to corresponding portions of each vehicle part in the undamaged version of the vehicle, and
determining whether each of the edge distribution, the texture comparison, and the spatial correlation exceed respective threshold difference values, wherein damage is detected in a vehicle part in the image if at least two of the edge distribution, the texture comparison, and the spatial correlation exceed the respective threshold difference value;
training a first Convolutional Neural Network (CNN) to detect a pose of a vehicle in an input image;
training a plurality of CNNs to detect damage to a respective plurality of external vehicle parts;
executing the first CNN to detect the pose of the vehicle in the image received by the server computing device from the client computing device;
executing the plurality of CNNs to determine which external vehicle parts are damaged in the image received by the server computing device from the client computing device; and
executing a Markov Random Field (MRF) algorithm to infer damage to internal parts of the vehicle from the determined damaged external vehicle parts; and
calculate an estimated repair cost for the vehicle based on accessing a parts database that includes repair and labor costs for each part in one or more damaged parts.

5. The system of claim 4, wherein the client computing device is further configured to:
receive, in a first user interface screen displayed on the display device, a selection to initiate a new vehicle claim;
display, in a second user interface screen displayed on the display device, graphical elements for selection of a prompting interface for capture of images of damage to the vehicle;
receive selection of a graphical element corresponding to a prompting interface;
display, in a third user interface screen, a three-dimensional (3D) model of the vehicle;
receive a selection of a damaged part on the 3D model; and
display an outline of the selected part to be captured with a camera of the client computing device;
cause the camera of the client computing device to capture the image of the vehicle based on displaying the outline of the selected part; and
cause the image of the vehicle to be transmitted to the server computing device.

6. The system of claim 5, wherein the client computing device is further configured to:
display a parts list;
receive a selection of a part from the parts list; and
display an outline of the part from the parts list to be captured with the camera of the client computing device.

7. The system of claim 5, wherein the client computing device is further configured to:
display two or more vehicle views; and
for each of the two or more vehicle views, display an outline of the view of the vehicle to be captured with the camera of the client computing device.

8. The system of claim 5, wherein the client computing device is operated by an owner or driver of the vehicle.

9. The system of claim 5, wherein the client computing device is operated by an insurance adjuster.

10. The system of claim 5, wherein the client computing device is operated by an employee of an auto repair shop.

11. The system of claim 4, wherein removing artifacts from the image includes:
   removing background material from the image; and
   removing specular reflection due to incident light on the vehicle shown in the image.

12. The system of claim 4, wherein displaying the one or more prompts on the display device of the client computing device comprises:
   displaying a 3D model of the vehicle;
   receiving a selection of a damaged part on the 3D model; and
   displaying an outline of the selected part to be captured with a camera of the client computing device.

13. The system of claim 4, wherein the client computing device comprises a mobile phone configured to execute a mobile application to capture the image of the vehicle and transmit the image to the server computing device over the electronic communications network.

* * * * *